United States Patent
Duello et al.

(10) Patent No.: US 8,668,758 B2
(45) Date of Patent: Mar. 11, 2014

(54) TRACKIFIED AIR FILTRATION MEDIA AND A SELF-SUPPORTING FILTER HAVING IMPROVED STIFFNESS AND FOLDABILITY

(75) Inventors: Leonard Duello, Hewitt, TX (US); Thomas Hawkins, Waco, TX (US); Christopher Peart, Kingsport, TN (US); Nathaniel Nance, Mexia, TX (US)

(73) Assignee: Polyester Fibers, LLC, Miami, FL (US)

( * ) Notice: Subject to any disclaimer, the term of this patent is extended or adjusted under 35 U.S.C. 154(b) by 343 days.

(21) Appl. No.: 12/734,541

(22) PCT Filed: Nov. 7, 2008

(86) PCT No.: PCT/FI2008/000123
§ 371 (c)(1),
(2), (4) Date: Sep. 29, 2010

(87) PCT Pub. No.: WO2009/060118
PCT Pub. Date: May 14, 2009

(65) Prior Publication Data
US 2011/0016839 A1    Jan. 27, 2011

Related U.S. Application Data

(63) Continuation of application No. 11/937,245, filed on Nov. 8, 2007, now abandoned, which is a continuation-in-part of application No. PCT/FI2007/050281, filed on May 16, 2007.

(60) Provisional application No. 60/866,820, filed on Nov. 21, 2006, provisional application No. 60/800,613, filed on May 16, 2006.

(51) Int. Cl.
| | |
|---|---|
| *B01D 39/14* | (2006.01) |
| *B01D 39/04* | (2006.01) |
| *D04H 1/00* | (2006.01) |
| *D04H 3/00* | (2012.01) |
| *D04H 5/00* | (2012.01) |
| *D04H 13/00* | (2006.01) |

(52) U.S. Cl.
USPC .................. 55/524; 55/528; 442/327

(58) Field of Classification Search
USPC ............... 55/524, 528; 442/327; 422/327
See application file for complete search history.

(56) References Cited

U.S. PATENT DOCUMENTS 5,785,725 A * 7/1998 Cusick et al. .................. 55/382
5,855,783 A * 1/1999 Shucosky et al. .......... 210/493.1
(Continued)

FOREIGN PATENT DOCUMENTS

WO    WO2006031625    * 3/2006

OTHER PUBLICATIONS

International Search Report for International Publication No. WO 2009/060118, published May 14, 2009, for International Application No. PCT/FI2008/000123, filed Nov. 7, 2008.

(Continued)

*Primary Examiner* — Amber Orlando
(74) *Attorney, Agent, or Firm* — Alix, Yale & Ristas, LLP

(57) ABSTRACT

The present disclosure relates generally to a nonwoven filtration media comprising a bonded mix of different, discontinuous, thermoplastic resin fibers and optionally discontinuous cellulosic fibers. In some embodiments a tackifier is added to the nonwoven filtration media to provide a sticky or adhesive surface on the fibers. The nonwoven media has an advantageous combination of stiffness, foldability, efficiency and the ability to retain a fold. The nonwoven media can be thermally bonded during the production process. The advantageous combination of mechanical properties allow the disclosed nonwoven media to accept and retain folds and pleats better than some conventional filtration materials while the mix of different fibers provides desirable filtration properties.

59 Claims, 7 Drawing Sheets

(56) References Cited

U.S. PATENT DOCUMENTS

| | | | |
|---|---|---|---|
| 6,583,072 B1* | 6/2003 | Kawakami et al. | 442/103 |
| 6,815,383 B1* | 11/2004 | Arnold | 442/362 |
| 8,057,567 B2* | 11/2011 | Webb et al. | 55/486 |
| 2001/0032446 A1* | 10/2001 | Choi et al. | 55/497 |
| 2002/0117252 A1* | 8/2002 | Baldwin | 156/178 |
| 2003/0203694 A1 | 10/2003 | Deka et al. | 442/359 |
| 2003/0212376 A1* | 11/2003 | Walter et al. | 604/358 |
| 2005/0020170 A1 | 1/2005 | Deka et al. | 442/327 |
| 2005/0136238 A1* | 6/2005 | Lindsay et al. | 428/304.4 |
| 2006/0070294 A1* | 4/2006 | Spittle | 47/9 |
| 2006/0180152 A1* | 8/2006 | Bostock et al. | 128/206.12 |
| 2007/0117481 A1 | 5/2007 | Day et al. | 442/50 |
| 2007/0175195 A1* | 8/2007 | Skirius et al. | 55/527 |
| 2008/0119806 A1* | 5/2008 | Nguyen | 604/366 |

OTHER PUBLICATIONS

International Preliminary Report on Patentability for International Application No. PCT/FI2008/000123, filed Nov. 7, 2008.

* cited by examiner ature of 8,668,758 B2

TRACKIFIED AIR FILTRATION MEDIA AND A SELF-SUPPORTING FILTER HAVING IMPROVED STIFFNESS AND FOLDABILITY

FIELD

The present invention relates generally to a tackified nonwoven air filtration media comprising a mix of discontinuous, thermoplastic resin fibers coated with a tackifier and having a combination of high stiffness, foldability and filtration properties. In some embodiments the tackifier is modified with fine particulate material or with one or more specific chemical compounds. The present invention also provides a method of making the filtration media. The present invention relates to a self-supporting filter and a method of its manufacture, too. In some embodiments the nonwoven filtration media can advantageously be used as a pleated air filter.

BACKGROUND

Nonwoven fabrics used as filtration media have some required filtration-related properties i.e. that they are permeable to the fluid being filtered yet have high filtration efficiency. High permeability to the fluid being filtered is desirable, or even required, as less energy is needed to move the fluid through the filter media. High filtration efficiency is, of course, desirable and required as it allows the filtration media to more effectively remove contaminants in the fluid being filtered. Filtration properties can be quantified using tests such as Frazier Permeability, dP (pressure drop), PFE (particle filtration efficiency) and Index.

In many applications, filtration media are required which have structural integrity by themselves for conversion into various shapes. For example, the filtration media can be folded into a pleated shape that gives far more surface area than a non-pleated shape in the same space. However, often the filtration media is not stiff enough but requires a specific support structure, for instance, a mesh to maintain the desired shape of the filter.

Large fibers in a filtration media provide stiffness for pleating but undesirably degrade filtration efficiency. Further, some stiff filtration media are difficult to fold and may not "hold" the pleat, allowing the pleat to close and degrading filtration properties. Small fibers in a filtration media improve filtration efficiency and foldability but reduce stiffness.

As a matter separate from the stiffness issue, filters provided with a tacky layer are known. The purpose of such a layer is to better trap impurities from the flowing media.

An example of a tackified filter has been discussed in WO-A2-2007/084953, which discloses a tacky allergen trap and filter medium. The allergen trap includes a woven or nonwoven substrate having at least one layer. The trap is treated with a tacky adhesive the purpose of which is to trap the allergens, like dust mites. The WO document focuses mainly on providing cushioning material, like mattresses, pillows and furniture cushions with one or more allergen retaining layers. As a secondary product a filtration media provided with at least one layer bearing a tacky adhesive is discussed. The only teaching of the WO document relating to filtration media is that the tacky material is incorporated into a filtering element as a filtering medium whereby the only purpose of the tacky adhesive is to capture and hold microscopic dust-like particles. No other function of the tacky adhesive has been discussed or suggested.

A problem area, already mentioned briefly above, where specific stiffness of a filtration material is needed, is various wireless filters, i.e. filters that have no backing mesh or hole plate, but that are self-supporting. The present filter materials are subject to high expectations trying to fill the customers' needs, which sometimes require opposite measures to take. For instance air filters should have high particle separation efficiency, they should have minimal pressure drop, they should be light, they should be recyclable, they should be stiff enough to hold their pleats etc., and the filter is supposed to meet all these requirements over its entire lifetime in all of its more or less expectable working conditions. In wireless media filter manufacturing the media occasionally comes in contact with compression rolls and pleating surfaces within the production line. Additives to the media for tack enhancement can have a breakdown in the internal adhesion to the media and be deposited on the production line surfaces. With continued production the tack buildup can produce negative effects, i.e. either pull at the media deforming it or the buildup can be picked off the surfaces of the production equipment and be deposited back on to the. Certain additives are possible to be included which both reduce the tackiness and improve the filtration efficiency over the tackiness alone.

SUMMARY

An object of the present invention is to solve at least some problems of the prior art filter materials and filters by means of a filter having improved stiffness and foldability.

Another object of the present invention is to develop a filtration media having an advantageous combination of stiffness, foldability, filtration properties and the ability to retain a fold.

Yet another object of the present invention is to develop a self-supporting filter the stiffness and foldability properties of which have been improved such that the filter of the present invention can be used without a backing mesh or hole plate.

The present invention relates generally to a nonwoven filtration media comprising a bonded mix of different, discontinuous, thermoplastic resin fibers and optionally discontinuous cellulosic fibers. The nonwoven filtration media can be thermally bonded during the production process. At least some of the fibers are coated with a tackifying agent. The tackified, nonwoven media has an advantageous combination of Gurley Stiffness, LED score foldability, and filtration properties. The advantageous combination of high stiffness and foldability properties allow the disclosed nonwoven media to accept and retain folds and pleats better than some conventional filtration materials while the tackifying agent and mix of different fibers provide desirable filtration properties.

The disclosed nonwoven filtration media may be used in a number of different applications. The media is advantageously used in air filtration for home or commercial heating, ventilating and air conditioning (HVAC) services. It may also be used in filtration of breathing air in transportation applications like automobile cabin air filtration, airplane cabin air filtration, and train and boat air filtration. While the nonwoven filtration media is preferably directed to air filtration, in different embodiments other gasses and other fluids may be filtered as well. Such other gasses may include, for example, nitrogen. Other fluids may include liquids like oil or water.

Additional, surprising effects can be found through the application of tack alone, such as increased stiffness. The addition of fine particulate material was found to surprisingly increase stiffness, as well.

In accordance with a first preferred embodiment of the present invention the tackified air filtration media comprises a thermally bonded nonwoven web comprising a generally homogeneous mixture of at least two types of fibers, the web comprising about 10% to about 90% by weight of a first type of fibers having a length of about 0.6 cm to about 20 cm, the fibers including a first fiber portion extending substantially continuously along the length of each fiber and comprising a first thermoplastic polymeric material having a first melting point and a second fiber portion extending substantially continuously along the length of each fiber and defining at least a portion of a fiber exterior surface, the second fiber portion comprising a second thermoplastic polymeric material having a second melting point lower than the first melting point, about 5% to about 70% by weight of a second type of fibers having a length of about 0.6 cm to about 20 cm, and a denier of 5 or less, and about 0% to about 40% by weight of a third type of fibers having a length of about 0.6 to about 20 cm and a denier of 7 or more; the nonwoven web having a basis weight in the range of about 90 gsm to about 370 gsm, and a thickness of about 1.0 mm to about 6.4 mm; and from about 0.5% to about 30% by weight of the nonwoven web of a tackifier on fibers of the air filtration media.

In accordance with a second preferred embodiment of the present invention a self-supporting filter having improved stiffness and foldability comprises a thermally bonded nonwoven web comprising a generally homogeneous mixture of at least two types of fibers, the web comprising about 10% to about 90% by weight of a first type of fibers having a length of about 0.6 cm to about 20 cm, the fibers including a first fiber portion extending substantially continuously along the length of each fiber and comprising a first thermoplastic polymeric material having a first melting point and a second fiber portion extending substantially continuously along the length of each fiber and defining at least a portion of a fiber exterior surface, the second fiber portion comprising a second thermoplastic polymeric material having a second melting point lower than the first melting point, about 5% to about 70% by weight of a second type of fibers having a length of about 0.6 cm to about 20 cm, and a denier of 6 or less, and about 0% to about 40% by weight of a third type of fibers having a length of about 0.6 to about 20 cm and a denier of 8 or more; the nonwoven web having a basis weight in the range of about 90 gsm to about 370 gsm, and a thickness of about 1.0 mm to about 6.4 mm; and from about 0.5 percent to about 30 percent by weight of the nonwoven web of a tackifier on fibers of the air filtration media.

In accordance with a third preferred embodiment of the present invention, the method of making a tackified air filtration media comprises:

forming a fiber mixture, comprising about 10% to about 90% by weight of a first type of fibers having a length of about 0.6 cm to about 20 cm, the fibers including a first fiber portion extending substantially continuously along the length of each fiber and comprising a first thermoplastic polymeric material having a first melting point and a second fiber portion extending substantially continuously along the length of each fiber and defining at least a portion of a fiber exterior surface, the second fiber portion comprising a second thermoplastic polymeric material having a second melting point lower than the first melting point, about 5% to about 70% by weight of a second type of fibers having a length of about 0.6 cm to about 20 cm, and a denier of 5 or less, and about 0% to about 40% by weight of a third type of fibers having a length of about 0.6 to about 20 cm and a denier of 8 or more;

forming the fiber mixture into a nonwoven matt;

bonding the fibers in the nonwoven matt to have a basis weight in the range of about 90 gsm to about 370 gsm, and a thickness of about 1.0 mm to about 6.4 mm, and applying 0.5 to about 30 percent by weight of the nonwoven matt of a tackifier to fibers of the bonded nonwoven matt to form the tackified air filtration media.

In accordance with a fourth preferred embodiment of the present invention the method of making a self-supporting filter having improved stiffness and foldability comprises:

forming a fiber mixture, comprising about 10% to about 90% by weight of a first type of fibers having a length of about 0.6 cm to about 20 cm, the fibers including a first fiber portion extending substantially continuously along the length of each fiber and comprising a first thermoplastic polymeric material having a first melting point and a second fiber portion extending substantially continuously along the length of each fiber and defining at least a portion of a fiber exterior surface, the second fiber portion comprising a second thermoplastic polymeric material having a second melting point lower than the first melting point, about 5% to about 70% by weight of a second type of fibers having a length of about 0.6 cm to about 20 cm, and a denier of 5 or less, and about 0% to about 40% by weight of a third type of fibers having a length of about 0.6 to about 20 cm and a denier of 8 or more;

forming the fiber mixture into a nonwoven matt;

bonding the fibers in the nonwoven matt to have a basis weight in the range of about 90 gsm to about 370 gsm, and a thickness of about 1.0 mm to about 6.4 mm, applying 0.5 to about 30 percent by weight of the nonwoven matt of a tackifier to fibers of the bonded nonwoven matt to form the tackified air filtration media, drying the tackifier, and shaping the nonwoven matt to form a three-dimensional self-supporting filter.

In accordance with a fifth preferred embodiment of the present invention the basis weight of the filtration material or the nonwoven matt is between about 120 gsm and 275 gsm.

In accordance with a sixth preferred embodiment of the present invention a tackifier of about 1.5%-about 15% by weight of the nonwoven matt is applied on said nonwoven matt.

In accordance with a seventh preferred embodiment of the present invention fine particulate material is applied into communication with the tackifier.

In accordance with an eighth preferred embodiment of the present invention 5 to 150 g/m$^2$ fine particulate material is applied into communication with the tackifier.

In accordance with a ninth preferred embodiment of the present invention the first fiber type of fibers is selected from at least one of about 30% to about 90% at most 4 denier conjugate fibers comprising polyester first and second fiber portions of about 30% to about 90% at least 10 denier conjugate fibers comprising polyester first and second fiber portions In accordance with a tenth preferred embodiment of the present invention the second type of fibers comprises about 10% to about 40% by weight of monocomponent polyester fibers having a denier in the range of about 0.9 to about 5.

In accordance with an eleventh preferred embodiment of the present invention the second type of fibers comprises additionally about 3% to about 30% by weight of other monocomponent polyester fibers having a denier in the range of about 0.9 to about 5.

In accordance with a twelfth preferred embodiment of the present invention the second type of fibers comprises about 10% to about 30% by weight of monocomponent polyester fibers having a denier of about 4.

In accordance with a thirteenth preferred embodiment of the present invention the third type of fibers comprises about 5% to about 30% by weight of monocomponent polyester fibers having a denier in the range of about 8 to about 45.

In accordance with a fourteenth preferred embodiment of the present invention the second type of fibers comprises about 10% to about 50% by weight of about 2-4 denier chargeable polypropylene fibers, and about 10% to about 50% about 2-4 denier chargeable modacrylic fibers.

In accordance with a fifteenth preferred embodiment of the present invention the second or third type of fibers comprises about 15% to about 30% polyester/cotton blend fibers; or about 15% to about 35% cellulosic fibers

BRIEF DESCRIPTION OF THE DRAWINGS

Referring now to the drawings wherein like elements are numbered alike in the several Figures.

DEFINITIONS

Figure 1:
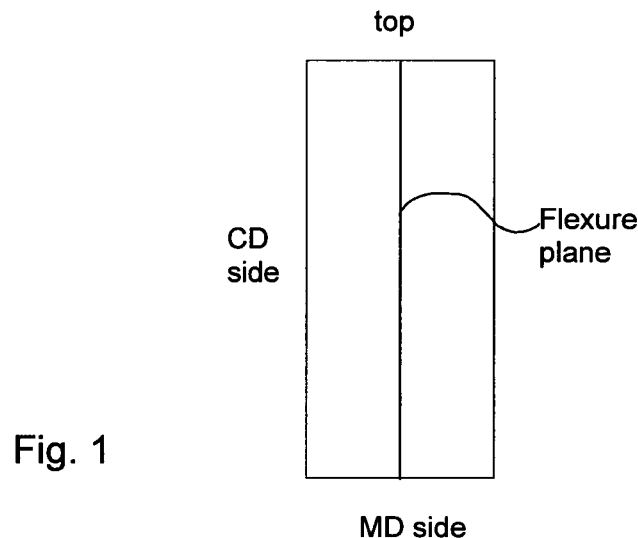
FIG. 1 is an illustration of a LED Score specimen showing orientation of the specimen to the nonwoven filtration media.

Biconstituent fiber—A fiber that has been formed from a mixture of two or more polymers extruded from the same spinneret. Biconstituent fibers do not have the various polymer components arranged in relatively constantly positioned distinct zones across the cross-sectional area of the fiber and the various polymers are usually not continuous along the entire length of the fiber, instead usually forming fibrils which start and end at random. Biconstituent fibers are sometimes also referred to as multiconstituent fibers.

Binder—An adhesive material used to bind a web of fibers together or bond one web to another. The principal properties of a binder are adhesion and cohesion. The binder can be in solid form, for example a powder, film or fiber, in liquid form, for example a solution, dispersion or emulsion or in foam form.

Bonding—The process of securing fibers or filaments to each other in a nonwoven web. The fibers or filaments can be secured by thermal bonding such as in calendering or through air bonding; mechanical means such as in needlepunching; or jets of pressurized fluid such as water in hydroentangling.

Calendering—the process of moving a nonwoven material between opposing surfaces. The opposing surfaces include flat platens, rollers, rollers having projections and combinations thereof. Either or both of the opposing surfaces may be heated.

Card—A machine designed to separate fibers from impurities, to align the fibers and deliver the aligned fibers as a batt or web. The fibers in the web can be aligned randomly or parallel with each other predominantly in the machine direction. The card consists of a series of rolls and drums that are covered with a plurality of projecting wires or metal teeth.

Carded web—A nonwoven web of discontinuous fibers produced by carding.

Carding—A process for making nonwoven webs on a card.

Cellulose fiber—A fiber comprised substantially of cellulose. Cellulosic fibers come from manmade sources (for example, regenerated cellulose fibers or lyocell fibers) or natural sources such as cellulose fibers or cellulose pulp from woody and non-woody plants. Woody plants include, for example, deciduous and coniferous trees. Non-woody plants include, for example, cotton, flax, esparto grass, kenaf, sisal, abaca, milkweed, straw, jute, hemp, and bagasse.

Cellulose material—A material comprised substantially of cellulose. The material may be a fiber or a film. Cellulosic materials come from manmade sources (for example, regenerated cellulose films and fibers) or natural sources such as fibers or pulp from woody and non-woody plants.

Conjugate fiber—A fiber comprising a first fiber portion extending substantially continuously along the length of the fiber and comprising a first thermoplastic polymeric material having a first melting point and a second fiber portion extending substantially continuously along the length of the fiber and defining at least a portion of a fiber exterior surface, the second fiber portion comprising a second thermoplastic polymeric material having a second melting point. Typically, the second melting point is lower than the first melting point. The fiber portions are arranged in substantially constantly positioned distinct zones across the cross-section of the fiber. A conjugate fiber includes fibers comprising two or more polymers or fiber portions. Conjugate fibers are formed by extruding polymer sources from separate extruders through a spinneret to form a single fiber. Typically, different polymeric materials are extruded from each extruder, although a conjugate fiber may encompass extrusion of the same polymeric material from separate extruders. The configuration of conjugate fibers can be symmetric (e.g., sheath:core or side:side) or they can be asymmetric (e.g., offset core within sheath; crescent moon configuration within a fiber having an overall round shape). The shape of the conjugate fiber can be any shape that is convenient to the producer for the intended end use, e.g., round, trilobal, triangular, dog-boned, flat or hollow.

Cross machine direction (CD—The nonwoven web direction perpendicular to the machine direction.

Denier—A unit used to indicate the fineness of a filament given by the weight in grams for 9,000 meters of filament. A filament of 1 denier has a mass of 1 gram for 9,000 meters of length.

Entanglement—A method of bonding a web by interlocking or wrapping fibers in the web about each other. The method may use mechanical means such as in needlepunching or jets of pressurized fluid such as water in hydroentangling.

Fiber—A material form characterized by an extremely high ratio of length to diameter. As used herein, the terms fiber and filament are used interchangeably unless otherwise specifically indicated.

Filament—A substantially continuous fiber. As used herein, the terms fiber and filament are used interchangeably unless otherwise specifically indicated.

Fine particulate material—Used in connection with the tackifier. An example of fine particulate material is ordinary sand having a mean particle diameter of 50 micron, the diameter ranging from about 10 to 100 micron. Also other materials than sand with other dimensions may be used.

Foam application—A method of applying a material such as a binder or tackifier in a foam form to a fibrous web. The foam form contains less fluid than the same material in a liquid form and thus requires less energy and time to dry the foam and, if applicable, cure the material.

Lyocell—Manmade cellulose material obtained by the direct dissolution of cellulose in an organic solvent without the formation of an intermediate compound and subsequent extrusion of the solution of cellulose and organic solvent into a coagulating bath.

Machine direction (MD)—The long direction of a nonwoven web material that is parallel to and in the direction in which the nonwoven web material is finally accumulated.

Meltblown fiber—A fiber formed by extruding a molten thermoplastic material as filaments from a plurality of fine, usually circular, die capillaries into a high velocity gas (e.g., air) stream which attenuates the filaments of molten thermoplastic material to reduce their diameter. Thereafter, the meltblown fibers are carried by the high velocity gas stream and are deposited on a collecting surface to form a web of randomly dispersed meltblown fibers. The meltblown process includes the melt spray process.

MERV—Minimum Efficiency Reporting Value which is defined in ASHRAE Standard 52.2-1999, Section 11.2.L and Section 12. As an example a MERV 6 filter will have the ability, as per the standard and under its specified conditions, to remove 35% to 50% of a 3-10 micron KCl particle insult. A MERV 7 filter will have the ability to remove 50% to 70% of a 3-10 micron KCl particle insult and a MERV 8 filter will have the ability to remove over 70% of a 3-10 micron KCl particle insult. The higher the MERV number, the higher the filtration performance of a filter.

Monocomponent fiber—A fiber formed from one or more extruders using only one polymer. This is not meant to exclude fibers formed from one polymer to which small amounts of additives have been added for coloration, antistatic properties, lubrication, hydrophilicity, etc. These additives, e.g. titanium dioxide for color, are generally present in low amounts such as less than 5 weight percent.

Needlepunching or Needling—A method of bonding a web by interlocking or wrapping fibers in the web about each other. The method uses a plurality of barbed needles to carry fiber portions in a vertical direction through the web.

Nonwoven fabric, sheet or web—A material having a structure of individual fibers that are interlaid, but not in an identifiable manner as in a woven or knitted fabric. Nonwoven materials have been formed from many processes such as, for example, meltblowing, spin laying, carding, air laying and water laying processes. The basis weight of nonwoven materials is usually expressed in weight per unit area, for example in grams per square meter (gsm) or ounces per square foot (osf) or ounces per square yard (osy). As used herein a nonwoven sheet includes a wetlaid paper sheet.

Polymer—A long chain of repeating, organic structural units. Generally includes, for example, homopolymers, copolymers, such as for example, block, graft, random and alternating copolymers, terpolymers, etc, and blends and modifications thereof. Furthermore, unless otherwise specifically limited, the term "polymer" includes all possible geometrical configurations. These configurations include, for example, isotactic, syndiotactic and random symmetries.

Regenerated cellulose—Manmade cellulose obtained by chemical treatment of natural cellulose to form a soluble chemical derivative or intermediate compound and subsequent decomposition of the derivative to regenerate the cellulose. Regenerated cellulose includes spun rayon and cellophane film. Regenerated cellulose processes include the viscose process, the cuprammonium process and saponification of cellulose acetate.

Short fiber—A fiber that has been formed at, or cut to, lengths of generally one quarter to one half inch (6 mm to 13 mm). good Spunlaid filament—A filament formed by extruding molten thermoplastic materials from a plurality of fine, usually circular, capillaries of a spinneret. The diameter of the extruded filaments is then rapidly reduced as by, for example, eductive drawing and/or other well-known mechanisms. Spunlaid fibers are generally continuous with deniers within the range of about 0.1 to 5 or more.

Spunbond nonwoven web—Webs formed (usually) in a single process by extruding at least one molten thermoplastic material as filaments from a plurality of fine, usually circular, capillaries of a spinneret. The filaments are partly quenched and then drawn out to reduce fiber denier and increase molecular orientation within the fiber. The filaments are generally continuous and not tacky when they are deposited onto a collecting surface as a fibrous batt. The spunlaid fibrous batt is then bonded by, for example, thermal bonding, calendering, chemical binders, mechanical needling, hydraulic entanglement or combinations thereof, to produce a nonwoven fabric.

Staple fiber—A fiber that has been formed at, or cut to, staple lengths of generally one quarter to eight inches (6 mm to 200 mm).

Stickiness—Adhesion characteristics of tack compounds which provide benefits seen. Can be a negative characteristic when found in combination with excessively high cohesion and removed from the media to buildup in the filter manufacturing process.

Synthetic fiber—a fiber comprised of manmade material, for example glass, polymer, combination of polymers, metal, carbon, regenerated cellulose or lyocell.

Substantially continuous—in reference to the polymeric filaments of a nonwoven web, it is meant that a majority of the filaments or fibers formed by extrusion through orifices remain continuous as they are drawn and then impacted on a collection device. Some filaments may be broken during the attenuation or drawing process, with a substantial majority of the filaments remaining continuous.

Tackifier or Tackiness Agent—a material such as a resin used to impart adhesive properties to otherwise nonadhesive materials such as a nonwoven web. A tackifier can coat the fibers in a nonwoven web to provide the web with adhesive fiber surfaces. Binder resins are typically not tackifiers as curing the binder resin substantially eliminates the ability of the binder to impart adhesive properties to the web.

Tex—A unit used to indicate the fineness of a filament given by the weight in grams for 1,000 meters of filament. A filament of 1 tex has a mass of 1 gram for 1,000 meters of length. Also unit called decitex, which is one tenth of tex, is frequently used. A filament of 1 dtex has a mass of 1 gram for 10,000 meters of length.

Thermal bonding—A calender process comprising passing a web of fibers to be bonded between a heated calender roll and an anvil roll. The anvil is usually flat. Filaments or fibers in the bonding area are joined by heat and pressure imparted by the rolls. Thermal bonding can also be used to join layers together in a composite material as well as to impart integrity to each individual layer by bonding filaments and/or fibers within each layer.

Thermal point bonding—A thermal bonding process comprising passing a web of fibers to be bonded between a heated calender roll and an anvil roll. The calender roll is patterned in some way so that the fabric is not bonded across its entire surface and the anvil is usually flat. Filaments or fibers in the bonding area are joined by heat and pressure imparted by the rolls. Typically, the percent bonding area varies from around 10% to around 30% of the web surface area. Thermal point bonding can also be used to join layers together in a composite material as well as to impart integrity to each individual layer by bonding filaments and/or fibers within each layer.

Thermoplastic polymer—A polymer that softens and is fusible when exposed to heat, returning generally to its unsoftened state when cooled to room temperature. Thermoplastic materials include, for example, polyvinyl chlorides, some polyesters, polyamides, polyfluorocarbons, polyolefins, some polyurethanes, polystyrenes, polyvinyl alcohol, copolymers of ethylene and at least one vinyl monomer (e.g., poly (ethylene vinyl acetates), and acrylic resins.

Triboelectrically charged fibers—Two yarns of dissimilar polymers that can be rubbed together and exchange charges in such a consistent manner that one fiber forms a positive charge and the other a negative charge.

In general, unless otherwise explicitly stated the disclosed materials and processes may be alternately formulated to comprise, consist of, or consist essentially of, any appropriate components, moieties or steps herein disclosed. The disclosed materials and processes may additionally, or alternatively, be formulated so as to be devoid, or substantially free, of any components, materials, ingredients, adjuvants, moieties, species and steps used in the prior art compositions or that are otherwise not necessary to the achievement of the function and/or objective of the present disclosure.

When the word "about" is used herein it is meant that the amount or condition it modifies can vary some beyond the stated amount so long as the function and/or objective of the disclosure are realized. The skilled artisan understands that there is seldom time to fully explore the extent of any area and expects that the disclosed result might extend, at least somewhat, beyond one or more of the disclosed limits. Later, having the benefit of this disclosure and understanding the concept and embodiments disclosed herein, a person of ordinary skill can, without inventive effort, explore beyond the disclosed limits and, when embodiments are found to be without any unexpected characteristics, those embodiments are within the meaning of the term about as used herein.

DETAILED DESCRIPTION

In one embodiment of the present invention, a thermally bonded nonwoven filtration media comprising a mixture of discontinuous fibers is disclosed. The different fibers are substantially homogeneously distributed throughout the thickness of the media. The nonwoven filtration media has an advantageous combination of Gurley Stiffness, foldability, and filtration efficiency.

The nonwoven filtration media can be comprised of many different staple length (6 mm-200 mm) fibers, including synthetic fibers and cellulose fibers.

In general, unless otherwise explicitly stated the disclosed materials and processes may be alternately formulated to comprise, consist of, or consist essentially of, any appropriate components, moieties or steps herein disclosed. The disclosed materials and processes may additionally, or alternatively, be formulated so as to be devoid, or substantially free, of any components, materials, ingredients, adjuvants, moieties, species and steps used in the prior art compositions or that are otherwise not necessary to the achievement of the function and/or objective of the present disclosure.

When the word "about" is used herein it is meant that the amount or condition it modifies can vary some beyond the stated amount so long as the function and/or objective of the disclosure are realized. The skilled artisan understands that there is seldom time to fully explore the extent of any area and expects that the disclosed result might extend, at least somewhat, beyond one or more of the disclosed limits. Later, having the benefit of this disclosure and understanding the concept and embodiments disclosed herein, a person of ordinary skill can, without inventive effort, explore beyond the disclosed limits and, when embodiments are found to be without any unexpected characteristics, those embodiments are within the meaning of the term about as used herein.

In one embodiment of the present invention, a thermally bonded nonwoven filtration media comprising a mixture of discontinuous fibers is disclosed. The different fibers are substantially homogeneously distributed throughout the thickness of the media. The nonwoven filtration media has an advantageous combination of Gurley Stiffness, foldability, and filtration efficiency.

The nonwoven filtration media can be comprised of many different staple length (6 mm-200 mm) fibers, including synthetic fibers and cellulose fibers.

Advantageously, the synthetic fibers include thermoplastic polymer fibers such as one or more of polyester, polyolefin and polyamide. Typically, at least some of the polymer fibers will be conjugate fibers. Advantageously, about 30 percent to about 85 percent of the polymer fibers will be conjugate fibers. As used in this disclosure, fiber percentages are by weight of total fibers in the final nonwoven filtration media. Some suitable synthetic fibers are listed below.

| Denier | Polymer | Supplier |
| --- | --- | --- |
| 4 denier | conjugate polyester core and polyester sheath | Stein of West Point GA |
| 10 denier | conjugate polyester core and polyester sheath | William Barnett and Sons good |
| 15 denier | conjugate polyester core and polyester sheath | Stein of West Point GA |
| 15 denier | Polyester | Stein of West Point GA |
| 2.25 denier | Polyester | RSM of Charlotte, NC |
| 3 denier | Polyester | Invista of Spartanburg, SC |
| 3 denier | Polypropylene | American Synthetics of Pendergrass, GA |

Triboelectrically charged fibers can comprise a combination of about 2 to 4 denier low finish or scoured polypropylene fibers and about 2 to 4 denier scoured modacrylic fibers.

Advantageously the cellulosic fibers include one or more of cotton fibers, rayon fibers, cumbernoil cotton fibers, lyocell fibers and kenaf bast fibers. Other cellulosic fibers may be useful in the disclosed nonwoven filtration media. It is believed that the cost of some cellulosic fiber materials, for example lyocell, may limit their use in some applications. Some suitable cellulosic fibers are listed below.

| Denier | Polymer | Supplier |
|---|---|---|
| Mixed | Polyester/cotton | Leigh Fibers of Charlotte, NC |
| 3.33 denier | Iyocell | Tencel of Axis, AL |
| Mixed | Cotton | Leigh Fibers of Charlotte, NC |

The nonwoven filtration media can also comprise a mixture or blend of recycled, staple length polyester fibers and cotton fibers.

Some exemplary staple fibers for use in the disclosed nonwoven filtration media are 0.9 denier monocomponent polyester fibers; 2.25 denier monocomponent polyester fibers; 3 denier monocomponent polyester fibers; 3 denier monocomponent polypropylene fibers; 4 denier polyester core/polyester sheath conjugate fibers; 10 denier polyester core/polyester sheath conjugate fibers; 15 denier polyester core/polyester sheath conjugate fibers; 15 denier monocomponent polyester fibers; 15 denier polyester core/polyester sheath conjugate fibers; 45 denier monocomponent polyester fibers; 2 to 4 denier low finish or scoured polypropylene fibers; 2 to 4 denier scoured modacrylic fibers; kenaf fibers; and rayon fibers. Naturally, fibers of other deniers, other polymers and other configurations may prove useful in the disclosed nonwoven filtration media.

There are numerous known technologies for forming a nonwoven filtration media from staple length fibers, including air laying, wet laying and carding. Presently, carding is considered an advantageous method for making the nonwoven filtration media. Preselected types of staple length fibers are mixed in preselected proportions and the mixture is fed to a card machine.

Many technologies can be employed to join or bond the fibers in the matt. Some useful bonding technologies include, for example, one or more of entangling, and thermal calendering of the matt to fuse thermoplastic fibers therein. Presently, mechanical entanglement such as needle punching is considered advantageous for joining both fibers of the matt.

Heat can be applied to the entangled matt to at least partially melt the thermoplastic fibers therein. Upon cooling, the melted thermoplastic fibers harden and fuse the fibers in the entangled matt. One advantageous method of thermal bonding is running the entangled matt over one or more heated rolls. Suitable temperatures are generally in the range of about 149° C. (300° F.) to about 216° C. (420° F.), depending on the matt contact time.

The nonwoven filtration media can be coupled to a second nonwoven web to form a layered composite filtration media. The second nonwoven web can be comprised of continuous filaments, for example a spunbonded web, or discontinuous fiber, for example a carded web or a wet laid web. Typically, the coupled media and web will be in continuous face to face contact. The coupled webs can be joined by adhesive bonding; thermal bonding; mechanical entanglement or ultrasonic bonding. Alternately, the nonwoven filtration media can be used as a base over which charged fibers, such as triboelectrically charged fibers, can be laid and mechanically entangled.

The nonwoven filtration media will have a basis weight (weight per unit area) of about 90 grams per square meter (gsm) (about 0.3 ounces per square foot (osf)) and up. The high limit for basis weight will depend on the end use application. Advantageously, the nonwoven filtration media will have a basis weight of about 90 gsm (about 0.3 osf) to about 370 gsm (about 1.2 osf). Preferably between about 120 gsm and 275 gsm.

The nonwoven filtration media will have a thickness of about 1.0 mm (about 0.04 inches) to about 6.4 mm (about 0.25 inches) or more depending on the end use application. Advantageously, the nonwoven filtration media will have a thickness of about 1.3 mm (about 0.05 inches) to about 3 mm (about 0.12 inches).

The disclosed nonwoven filtration media may be made into a filter by any suitable means known in the art, for example by rotary pleating. Rotary pleating, while faster than many other pleating methods, is indicated to be quite dependent upon the stiffness of the filter medium. Rotary pleating is discussed in, for example, U.S. Pat. No. 5,709,735 to Midkiff and Neely. Other methods of pleating are not as sensitive to filtration media stiffness but are slower.

In one advantageous embodiment of the present invention, a tackifier is coated over fibers of the nonwoven media. A tackifier is a natural or synthetic material that adheres to, and provides a long lasting sticky or adhesive surface on the fibers of the nonwoven filtration media. Some suitable tackifiers include elastomeric polymeric emulsions such as HyStretch® elastomeric emulsions available from Lubrizol Advanced materials of Pittsburgh, Pa.; FLEXCRYL® adhesive emulsions available from Air Products Polymers L.P. of Allentown, Pa.; and SPAR CRYL materials available from Spartan Chemical Laboratories, Inc. of Spartanburg, S.C.

The amount of tackifier added to the nonwoven filtration media can typically be in the range of about 0.5 percent by weight of the nonwoven filtration media to about 30 percent by weight of the nonwoven filtration media. Advantageously, the amount of tackifier added to the nonwoven filtration media can be in the range of about 1.5 percent by weight of the nonwoven filtration media to about 15 percent by weight of the nonwoven filtration media. The preferred amount of tackifier in some embodiments can be in the range of about 1.5% to about 6% while in other embodiments the amount of tackifier can be in the range of about 1.5% to about 3%.

Tackifiers are typically applied as an emulsion, solution or foam and excess fluid removed, for example by heating (in an oven) or drying in atmospheric conditions (air drying). The tackifier emulsion or solution can be added using conventional processes, for example, by foaming, spraying, brushing or dipping the nonwoven filtration media.

In one presently preferred method, preselected types of staple length (preferably 6 mm-200 mm) fibers are mixed in preselected proportions. The staple length fiber mixture is fed to a card machine. The card machine forms the mixed, staple length fibers into a matt. The matt is cross lapped to increase basis weight and rearrange fiber orientation. The carded and lapped matt is needle punched to mechanically entangle the fibers therein. The entangled matt is thermally bonded by running the matt over one or more heated rolls. The matt can also be optionally compressed by rolls during thermal bonding. Liquid resin binders are optionally applied to the thermal bonded matt. The binder treated matt is heated to dry the matt and/or to cure the binder.

In accordance with another preferred embodiment of the present invention a nonwoven web can optionally be superimposed on the carded matt prior to needle punching so that the carded matt and nonwoven web are mechanically entangled into a composite filtration media. The nonwoven web is in accordance with a further preferred embodiment of the invention a carded and cross lapped matt.

A tackifier, typically in solution, can be added to the nonwoven filtration media at any convenient point during manufacturing. Application of a tackifier solution to the fibers before carding or to the carded matt before thermal bonding can lead to problems with formation of the desired nonwoven filtration media. Thereby, it is advantageous to apply the tackifier to the nonwoven filtration media after thermal bonding of the fibers.

As discussed above the nonwoven filtration media has an advantageous combination of Gurley Stiffness, foldability, and filtration properties. Filtration properties can be quantified using tests such as Frazier Permeability, dP, PFE efficiency and Index. Test methods are discussed below.

Frazier Air Permeability

Frazier air permeability test is a measure of the permeability of a filtration media to air. The Frazier test is performed in accordance with ASTM D461-72, D737-75, F778-82, TAPPI T251 and ISO 9237, and is reported as an average of 4 sample readings. The test reports the amount of air that flows in cubic feet per minute per square foot at a resistance of 12, 5 mm (0.5") water gauge. CFM/square foot results are converted to cubic meter per square meter per second by multiplying CFM/square foot by 0.00508. It is believed advantageous that the disclosed nonwoven filtration media have a Frazier Permeability in the range of about 0.76 $m^3/m^2/s$ (150 CFM/square foot) to about 4.32 $m^3/m^2/s$ (850 CFM/square foot).

dP and PFE Efficiency dP and PFE are test results from ASHRAE standard ASHRAE 52.2-1999. dP is pressure drop or resistance as measured in Pascals (Pa) or in inches of water gauge at 110 feet per minute (0.56 m/s) air velocity (Table 1 gives the pressure drop in Pa). PFE is the particle filtration efficiency percentage at 0.56 m/s (110 feet per minute) air velocity. One reportable PFE range averages the efficiency between 3 to 10 micron particle sizes and another reportable range averages the efficiency between the 1 to 3 micron particle sizes. It is believed advantageous that the disclosed nonwoven filtration media have a dP in the range of about 0.29 Pa to about 2.16 Pa (about 0.03 to about 0.22 inches water gauge) and a 3 to 10 micron range particle fraction efficiency of between 17.8% and 93.3% and/or a 1 to 3 micron range particle fraction efficiency of between 1.5% and 71.4%.

Index

Index is calculated using the PFE result for 3 to 10 micron efficiency divided by dP. Index is unitless. It is believed advantageous that the disclosed nonwoven filtration media have an Index in the range of about 30 to about 160.

Gurley Stiffness

Gurley Stiffness measures nonwoven filtration media stiffness. The Gurley Stiffness test method, discussed in more detail below, generally follows TAPPI Method T 543 om-94. Gurley stiffness is measured in the machine direction (MD) and results are reported in milligrams.

1) Level the tester using the bubble level on front/top.
2) Obtain a square foot (305 mm by 305 mm) sample of media with the MD marked on it, ensuring the product has not been excessively handled or bent.
3) With reference to FIG. 1, cut three specimens across the width that are 1"×2" (25.4 mm×51 mm) with 2" (51 mm) side being parallel to the CD. Mark samples "CD". These samples reflect flexure in the MD plane and are used to obtain MD Gurley stiffness values.
4) Cut three specimens across the width that are 2"×1" (51 mm×25.4 mm) with 2" (51 mm) side being parallel to the MD. Mark samples "CD". These samples reflect flexure in the CD plane and are used to obtain CD Gurley stiffness values.
5) Set up tester as in table below.
6) Orient the specimen in Gurley holder with 2" (51 mm) side in jaws and fuzzy (AIR ENTERING) side facing right, position sample to the right.
7) Always start first arm movement from right to left.
8) Once media releases from vane stop all movement. Wait one minute to allow arm movement to slow and stop it (+/−¼" (about 6 mm)) gently.
9) Start arm movement to left until media releases from vane.
10) Push the converter button and record the record values.
11) Average the three tests for both MD and CD separately and report average of three for each.

| Parameter | Setting |
| --- | --- |
| Length (inches) | 1.5 (38 mm) |
| Width (inches) | 2.0 (51 mm) |
| Weight position (inches) | 2.0 (51 mm) |
| Weight (grams) | 200 |

The stiffer the nonwoven, the higher the Gurley stiffness reading. A Gurley Bending Resistance Tester model 4171 D available from Gurley Precision Instruments of Troy, N.Y. has been found suitable for the above testing.

LED Foldability Score

Figure 2:
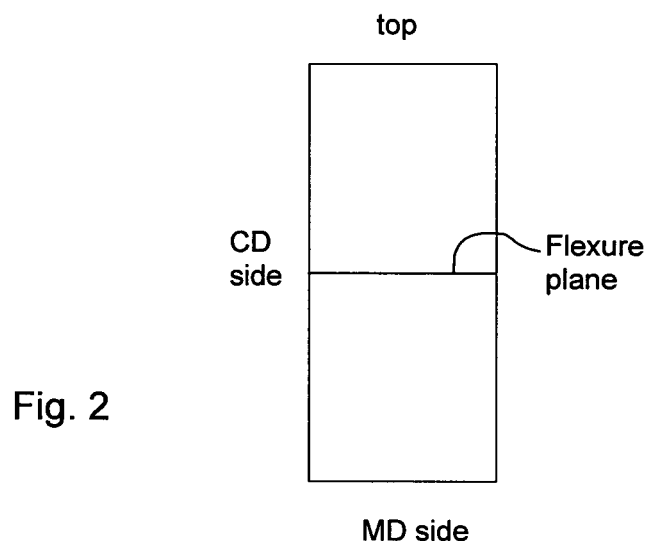
FIG. 2 is an illustration of a Gurley Stiffness specimen showing orientation of the specimen to the nonwoven filtration media.
Figure 3:
FIG. 3 is an illustration of preparation of a specimen for the LED score foldability test.
Figure 4:
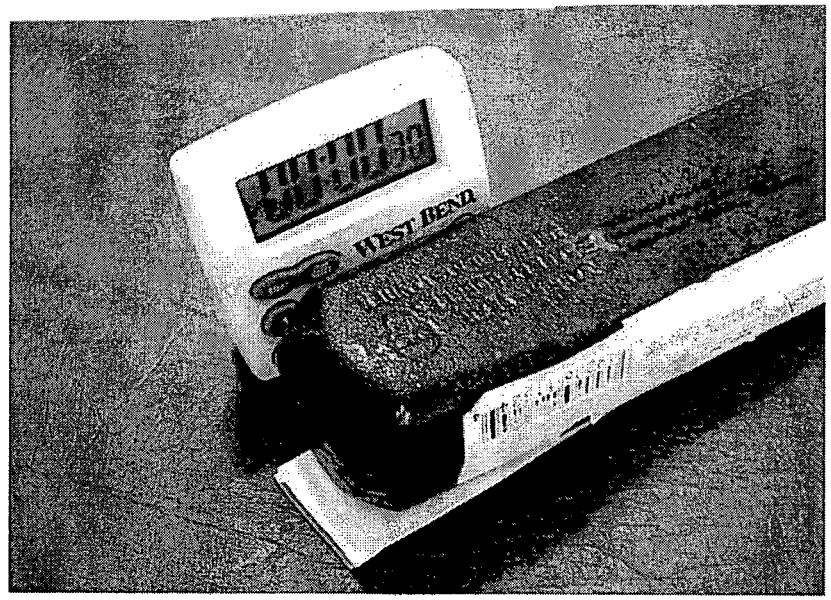
FIG. 4 is an illustration of compression of a specimen for the LED score foldability test.
Figure 5:
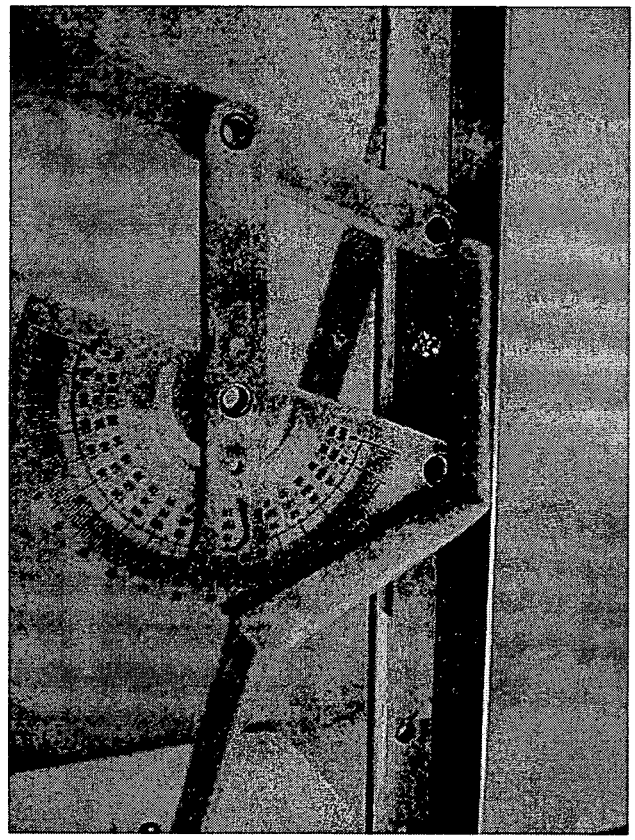
FIG. 5 is an illustration of measurement of the LED score test angle.

The "LED score" test measures the ability of a nonwoven media to accept and retain a fold. The "LED score" test is similar to a Shirley Crease Retention Test, (American Association of Textile and Color Chemists (AATCC)—66-2003 et al). Briefly, the "LED score" test is performed using the following procedure:

1) Obtain specimen.
2) With reference to FIG. 2, cut specimen into a ½" (12.7 mm) wide×4" (102 mm) long test sample with long direction parallel to CD.
3) Place test sample on flat metal surface.
4) Place angle iron in contact with test sample with apex against sample.
5) Strike angle iron once with 1170 gram hammer.
6) Fold test sample at score and place in file folder type cardboard sleeve. See FIG. 3.
7) Place folded test sample and sleeve under 1800 gram weight for 30 seconds. See FIG. 4.
8) Remove weight from folded test sample and sleeve and remove test sample from sleeve keeping it closed.
9) Position test sample vertically immediately in front of measuring apparatus.
10) Release and slip vertical leg of test sample into measuring apparatus.
11) Within 3 to 5 seconds align bottom of protractor portion with free leg of test sample.
12) Read "LED Score" test result. See FIG. 5.
13) Repeat three times for each specimen.
14) Average results.

The measured angle is related to the nonwoven filtration media's resistance to opening, e.g. the ability to retain a fold or pleat. The more foldable a nonwoven, the higher the LED score angle.

The right combination or range of Gurley stiffness and retained foldability properties allows a nonwoven filtration media material to accept and hold a better fold or pleat with a straighter line between the fold peak and valley than other nonwoven filtration medias having properties outside of this range. Such combinations of Gurley stiffness and retained foldability properties are desirable in the manufacture of filter products. Naturally, not every nonwoven will have the advantageous combinations of Gurley stiffness and retained foldability properties disclosed herein. Further, even nonwoven media having similar combinations of Gurley stiffness and retained foldability properties to those disclosed herein will not have the presently disclosed filtration properties.

Filters used in heating, ventilation and air conditioning (HVAC) systems can comprise a peripheral housing defining an open center with nonwoven filtration media sealed to the housing and spanning the open center. The housing allows the filter to be handled and sealed to the HVAC system. Air to be filtered is moved through the media. Thus, during use the nonwoven filtration media is subjected to a pressure drop caused by air movement through that media. The filter and nonwoven filtration media are also subjected to varying temperature and humidity conditions depending on geographic location and time of year.

Some nonwoven media cannot maintain their three-dimensional shape, for example pleats, when subjected to the pressure drop and varying temperature and humidity conditions of a HVAC system unless one or both faces of the nonwoven media is supported by an open mesh framework spanning the edges of the housing.

In some embodiments the disclosed nonwoven filtration media is self supporting, that is the media has a combination of stiffness and retained foldability to allow it to maintain its three-dimensional shape when used in a HVAC system without requiring face support by an open mesh framework spanning the edges of the housing.

It has been surprisingly found out that treating the nonwoven with tack alone has resulted in increased stiffness of the product, see data in FIGS. 6a through 6e. The MD Gurley increased by 11.4% when samples were air dried and 27.7% when samples were oven dried (heat dried). Increased stiffness was also seen with the addition of fine particulate material, and FIGS. 7a and 7b. The influence of the tackifier addition in the pressure drop and particle filtration has also been studied, see Table 2.

Having generally described the invention, the following examples and those on the attached Tables 1 and 2 are included for purposes of illustration so that the invention may be more readily understood and are in no way intended to limit the scope of the invention unless otherwise specifically indicated. The Examples were comprised of staple fibers in the combinations shown on the Table 1 and were prepared using conventional carding and cross lapping equipment and conditions. Unless otherwise noted the examples were bonded using heated rollers, sometimes in combination with oven heating unless otherwise indicated. Some examples were bonded using ultrasonic energy.

Tackified Nonwoven Filtration Media 1

Examples 218 and 219 and Example 220 were prepared by carding and cross lapping fibers to form a matt. This matt comprises about 63% 4 denier staple length, lower melting point polyester sheath, higher melting point polyester core conjugate fibers, about 17% 15 denier staple length, monocomponent polyester fibers and about 20% 3 denier staple length, monocomponent polyester fibers. The fibers are substantially homogeneously distributed throughout the single layer media.

One side of the matt was heated over a heated roller to partially melt and fuse the fibers. No tackifier or tack agent was applied to the media of Examples 218, 219 and 220.

This filtration media has, on average, a basis weight of about 157 gsm, a Frazier permeability of about 2.52 m$^3$/m$^2$/s, a dP of about 0.73 Pa, a PFE efficiency of about 51.8%, an index of about 70.6, an MD Gurley stiffness of about 2493 milligrams and a LED score test result of about 66.1 degrees.

Examples 221, 222 and 223 used the media of examples 218 to 220. An aqueous emulsion of HyStretch V-60 tack agent was sprayed against one side of the media to provide the add-on percentages shown in Table 1. Examples 221 and 222 were dried by running through a three zone forced air dryer (oven) with zone temperatures of about 138° C. (280° F.), 160° C. (320° F.) and 177° C. (350° F.). Example 223 was dried in still air at ambient temperature about 26° C. (about 78° F.) for about 14 hours so as to dry the media to the touch. Physical properties of these Examples are illustrated on Table 1.

Examples 224, 225, 226, 227 and 228 used the media of examples 218 to 220. An aqueous emulsion of HyStretch V-60 tack agent, available from Lubrizol of Pittsburgh, Pa., was sprayed against both sides of the media to provide the add-on percentages shown in Table 1. Examples 224 and 225 were dried by running through a three zone forced air dryer (oven) with zone temperatures of about 138° C. (280° F.), 160° C. (320° F.) and 177° C. (350° F.). Examples 226, 227 and 228 were dried in still air at ambient temperature about 18° C. to about 26° C. (about 65° F. to about 78° F.) for about 14 hours so as to dry the media to the touch. Physical properties of these Examples are illustrated on Table 1.

Example 229 used the media of examples 218 to 220. An aqueous emulsion of FLEXCRYL 1625 tack agent, available from Air Products Polymers of Allentown, Pa., was sprayed against both sides of the media to provide the add-on percentage shown in Table 1. Example 229 was dried in still air at ambient temperature about 18° C. (about 65° F.) for about 14 hours so as to dry the media to the touch. Physical properties of these Examples are illustrated on Table 1.

Examples 230 and 231 used the media of examples 218 to 220. An aqueous emulsion of Spar Cryl 102 tack agent, available from Spartan Chemical Laboratories, Inc of Spartanburg, S.C., was sprayed against both sides of the media to provide the add-on percentages shown in Table 1. Examples 230 and 231 were dried in still air at ambient temperatures about 18° C. (about 65° F.) for about 14 hours so as to dry the media to the touch. Physical properties of these Examples are illustrated on Table 1.

Tackified Nonwoven Filtration Media 2

Examples 232 and 233 were prepared by carding and cross lapping fibers to form a matt. This matt comprises about 50% 15 denier staple length, lower melting point polyester sheath, higher melting point polyester core conjugate fibers, about 15% 2.25 denier staple length, monocomponent polyester fibers and about 35% 45 denier staple length, monocomponent polyester fibers. The fibers are substantially homogeneously distributed throughout the single layer media.

One side of the matt was heated over a heated roller to partially melt and fuse the fibers. No tackifier or tack agent was applied to the media of Examples 232 and 233.

This filtration media has, on average, a basis weight of about 159 gsm, a Frazier permeability of about 3.15 m$^3$/m$^2$/s a dP of about 0.50 Pa, a PFE efficiency of about 43.3, an index of about 86.6, a MD Gurley stiffness of about 1872 milligrams and a LED score test result of about 78.6 degrees.

Examples 234 and 235 used the media of examples 232 to 233. An aqueous emulsion of HyStretch V-60 tack agent was sprayed against one side of the media to provide the add-on percentages shown in Table 1. Examples 234 and 235 were dried in still air at ambient temperatures about 26° C. (about 78° F.) for about 14 hours so as to dry the media to the touch. Physical properties of these Examples are illustrated on Table 1.

Examples 236, 237 and 238 used the media of Examples 232 and 233. An aqueous emulsion of HyStretch V-60 tack agent, available from Lubrizol of Pittsburgh, Pa., was sprayed against both sides of the media to provide the add-on percentages shown in Table 1. Examples 236 and 237 were dried in still air at ambient temperatures (about 78° F.) for about 14 hours so as to dry the media to the touch. Example 238 was dried by running through a three zone forced air dryer (oven) with zone temperatures of about 138° C. (280° F.), 160° C. (320° F.) and 177° C. (350° F.). Physical properties of these Examples are illustrated on Table 1.

Tackified Nonwoven Filtration Media 3

Example 239 comprises about 38% 15 denier staple length, lower melting point polyester sheath, higher melting point polyester core conjugate fibers, about 11.4% 2.25 denier staple length, monocomponent polyester fibers, about 26% 45 denier staple length, monocomponent polyester fibers, about 12% 3.3 denier staple length, triboelectrically chargeable polypropylene fibers and about 12% 3 denier staple length, triboelectrically chargeable modacrylic fibers. Example 239 was prepared by carding and cross lapping a combination of 50% 15 denier conjugate fibers, 15% 2.25 denier polyester fibers and 35% 45 denier polyester fibers to form a matt. The matt was entangled by needling and heated over a heated roller to partially melt and fuse the fibers. The tribocharged fibers (about 12% about 3.3 denier staple length, triboelectrically chargeable polypropylene fibers and about 12% about 3 denier staple length, triboelectrically chargeable modacrylic fibers) were homogeneously blended, applied over the matt and entangled into the matt using needling. The matt and entangled, tribocharged fibers were heated over a heated roller to partially melt and fuse the fibers. No tackifier or tack agent was applied to the media of Examples 239.

This filtration media has a basis weight of about 159 gsm, a Frazier permeability of about 2.57 $m^3/m^2/s$, a dP of about 0.76 Pa, a PFE efficiency of about 77.9, an index of about 102.5, a MD Gurley stiffness of about 1731 milligrams and a LED score test result of about 65.3 degrees.

Example 240 used the media of example 239. An aqueous emulsion of HyStretch V-60 tack agent, available from Lubrizol of Pittsburgh, Pa., was sprayed against both sides of the media to provide the add-on percentage shown in Table 1. Example 240 was dried in still air at ambient temperatures about 18° C. (about 65° F.) for about 14 hours so as to dry the media to the touch.

Example 241 used the media of example 239. An aqueous emulsion of FLEXCRYL 1625 tack agent, available from Air Products Polymers of Allentown, Pa., was sprayed against both sides of the media to provide the add-on percentage shown in Table 1. Example 241 was dried in still air at ambient temperatures about 26° C. (about 78° F.) for about 14 hours so as to dry the media to the touch.

Example 242 used the media of examples 239. An aqueous emulsion of Spar Cryl 102 tack agent, available from Spartan Chemical Laboratories, Inc of Spartanburg, S.C., was sprayed against both sides of the media to provide the add-on percentage shown in Table 1. Example 242 was dried in still air at ambient temperatures about 26° C. (about 78° F.) for about 14 hours so as to dry the media to the touch. Physical properties of these Examples are illustrated on Table 1.

Tackified, Two Layer, Nonwoven Filtration Media 4

Example 243 is a 2 layer nonwoven filtration media. Each layer was an independently carded matt formed using a different card machine. One carded matt comprised 50% 4 denier, staple length, lower melting point polyester sheath, higher melting point polyester core conjugate fibers and 50% 3 denier, staple length polyester fibers. The other carded matt comprised 50% 4 denier, staple length, lower melting point polyester sheath, higher melting point polyester core conjugate fibers and 50% 3 denier, staple length polyester fibers. Each carded matt was cross lapped using a separate cross lapper. The cross lapped malts were overlaid, mechanically entangled by needling. One side of the entangled malts was run over a heated roller to partially melt and fuse the fibers in the media. Each carded matt contributed one half to the weight of this 2 layer nonwoven filtration media. No tackifier or tack agent was applied to the media of Examples 243.

This filtration media has a basis weight of about 150 gsm, a Frazier permeability of about 2.52 $m^3/m^2/s$, a dP of about 0.74 Pa, a PFE efficiency of about 45.4, an index of about 61.4, a MD Gurley stiffness of about 2300 milligrams and a LED score test result of about 71.6 degrees.

Example 244 used the media of example 243. An aqueous emulsion of HyStretch V-60 tack agent, available from Lubrizol of Pittsburgh, Pa., was sprayed against both sides of the media to provide the add-on percentage shown in Table 1. Example 244 was dried by running through a three zone forced air dryer (oven) with zone temperatures of about 138° C. (280° F.), 160° C. (320° F.) and 177° C. (350° F.). Physical properties of this Example are illustrated on Table 1.

Tackified Nonwoven Filtration Media 5

Example 245 was prepared by carding and cross lapping fibers to form a matt. This matt comprises about 50% 4 denier staple length, lower melting point polyester sheath, higher melting point polyester core conjugate fibers, about 8% 0.9 denier staple length, monocomponent polyester fibers and about 43% 2.25 denier staple length, monocomponent polyester fibers. The fibers are substantially homogeneously distributed throughout the single layer media.

One side of the matt was heated over a heated roller to partially melt and fuse the fibers. No tackifier or tack agent was applied to the media of Example 245.

This filtration media has a basis weight of about 174 gsm, a Frazier permeability of about 1.17 $m^3/m^2/s$, a dP of about 1.65 Pa, a PFE efficiency of about 88.3, an index of about 53.5, a MD Gurley stiffness of about 1965 milligrams and a LED score test result of about 51 degrees.

Examples 246 and 247 used the media of example 245. An aqueous emulsion of HyStretch V-60 tack agent was sprayed against both sides of the media to provide the add-on percentages shown in Table 1. Examples 246 and 247 were dried by running through a three zone forced air dryer with zone temperatures of about 138° C. (280° F.), 160° C. (320° F.) and 177° C. (350° F.). Physical properties of these Examples are illustrated on Table 1.

Tackified Nonwoven Filtration Media 6

Examples 248 to 252 were prepared by carding and cross lapping fibers to form a matt. This matt comprises about 80% 4 denier staple length, lower melting point polyester sheath, higher melting point polyester core conjugate fibers and about 20% 3 denier staple length, monocomponent polyester fibers. The fibers are substantially homogeneously distributed throughout the single layer media. One side of the matt was heated over a heated roller to partially melt and fuse the fibers.

Foams were prepared by mixing the reported amounts of tackifier and water. The tackifier and water mixture was wisked forcefully for about 60 seconds to entrain air into the mixture and form a foam. The foam was applied to the media in a uniform fashion using a flat blade applicator.

The aqueous based foam of HyStretch V-60 tack agent was applied to one side of Examples 248 to 252 to provide the add-on percentages shown in Table 1 by weight. Examples 248 to 252 were dried for about four hours at a temperature in the range of about 16° C. (60° F.) to about 27° C. (80° F.). Physical properties of these Examples are illustrated on Table 1.

For a nonwoven, self supporting media a minimum basis weight is required to achieve a desired efficiency. A nonwoven, self supporting, non-tackified MERV 6 efficiency filtration media will typically require a basis weight of about 120 gsm (0.4 osf). To increase the efficiency of that media to MERV 8, the basis weight will have to be increased to about 180 gsm (0.6 osf). Surprisingly, if a tackifier is added to a nonwoven, self supporting, MERV 6 efficiency filtration media having a basis weight of about 120 gsm (0.4 osf) the resulting tackified filtration media can achieve a MERV 8 efficiency. Further surprisingly, adding a tackifier to a self supporting filtration media appears to increase stiffness of the resulting tackified media. Thus, adding a tackifier to a self supporting media provides surprising increases to efficiency and stiffness without increasing base media weight.

Tackified Nonwoven Filtration Media—Additional Samples

Two sets of media were prepared similarly to Example 239. In both sets the media was sprayed with one of three tacks; HyStretch V-60, FLEXCRYL 1695 or Spar Cryl 102. In one set fine particulate material, i.e. material having a mean particle diameter of about 50 micron and the diameter ranging from about 10 to about 100 microns, was added in a spray solution while in the other set no fine particulate material was added. The amount of fine particulate material sprayed on the filtration media was between 24.8 and 87.2 grams per square meter. The MD Gurleys for the set without the fine particulate material was 1781 mg while the MD Gurleys for the set with the fine particulate material was 2041 mg. This is a 259 mg, or 14.6% increase in stiffness due to the fine particulate material addition. Another two sets of media were prepared similarly to Examples 224, 229 and 230. In both sets the media was sprayed with one of three tacks; HyStretch V-60, FLEX-CRYL 1695 or Spar Cryl 102. In one set fine particulate material was added in a spray solution while in the other set no fine particulate material was added. The amount of fine particulate material sprayed on the filtration media was between 35.5 and 87.2 grams per square meter. The MD Gurleys for the set without the fine particulate material was 3125 mg while the MD Gurleys for the set with the fine particulate material was 3423 mg. This is a 298 mg, or 9.5% increase in stiffness due to the fine particulate material addition.

It has to be understood here that though the fine particulate material may be sprayed on the filtration media with the tackifier, as explained above, it may as well be scattered on the filtration media after the application of the tackifier. Preferably the fine particulate material scattering is performed prior to drying the tackifier.

Figure 6A:
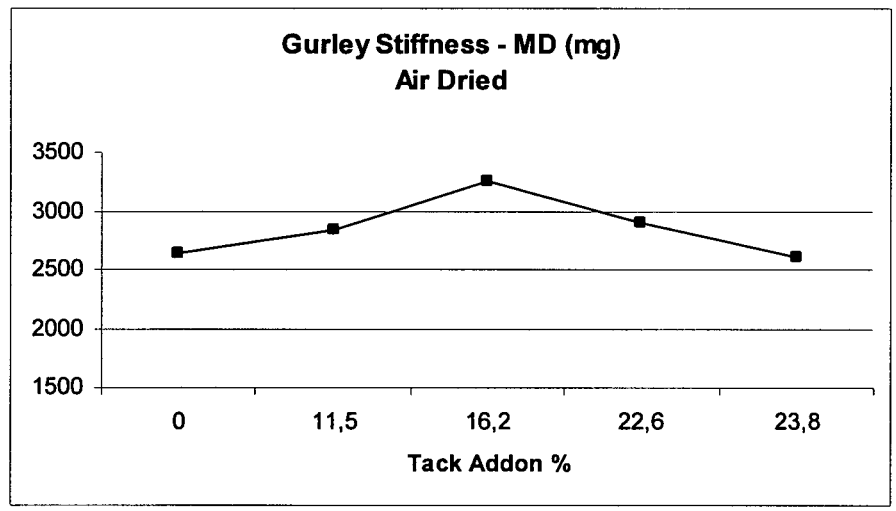
FIGS. 6a and 6b are graphs illustrating the improvement in the Gurley Stiffness as a function of tack material addon % concerning an air dried filtration material.

FIG. 6a illustrates the Gurley Stiffness as a function of tack addon % while the filtration material is dried in still ambient air. The average stiffness value of examples 218-220 with no tack addon form the basis for this comparison. Examples 223, and 226 through 228 where the tack (V-60) was added on both sides of the nonwoven are shown. The Figure shows a clear improvement of product stiffness with increasing tack. However, it appears also that the tack increase starts decreasing the product stiffness after a certain borderline value.

Figure 6B:
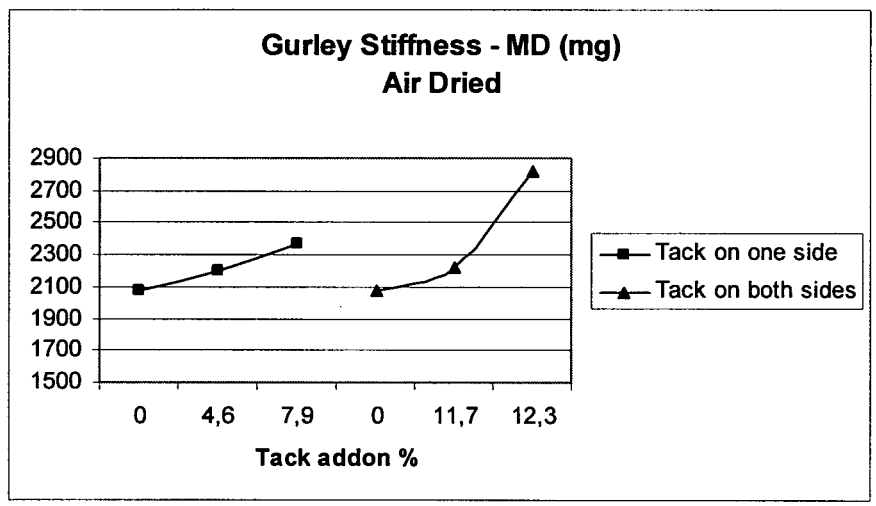

FIG. 6b illustrates the Gurley Stiffness as a function of tack addon % while the filtration material is dried in still ambient air. The average stiffness values of examples 232 and 233 with no tack addon form the basis for this comparison. On the one hand, examples 234 and 235 with tack added on one side of the filtration material, and on the other hand, examples 236 and 237 where the tack was added on both sides of the nonwoven, show clear increase of product stiffness with increasing tack addon.

Figure 6C:
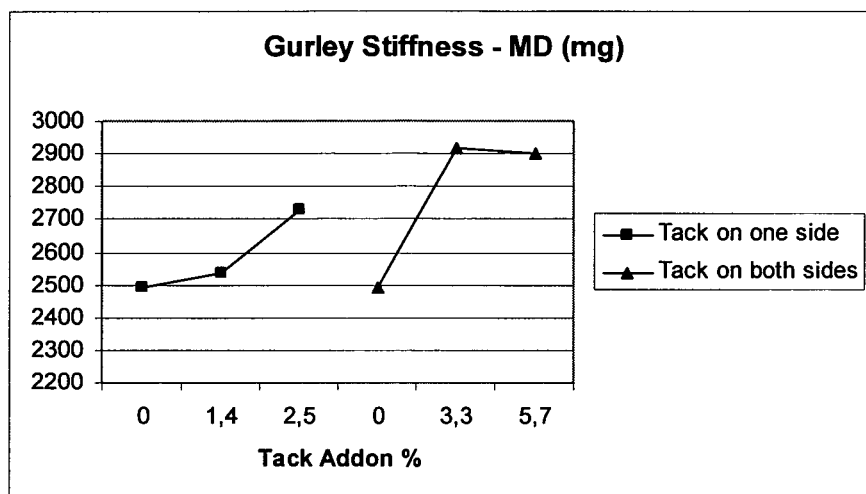
FIGS. 6c-6e are graphs illustrating the improvement in the Gurley Stiffness as a function of tack material addon % concerning a heat dried filtration material.

FIG. 6c illustrates the Gurley Stiffness as a function of tack addon % while the filtration material is dried by running through three different heated zones. The average stiffness value of examples 218-220 with no tack addon form the basis for this comparison. Examples 221 and 222, where the tackifier was added on one side of the product only, show clear increase in product stiffness with increase in tackifier addon %. Examples 223 and 224, where the tackifier was added on both sides of the product show similarly clear increase from 0% tack to 3.3% tack whereafter the stiffness remains substantially the same.

Figure 6D:
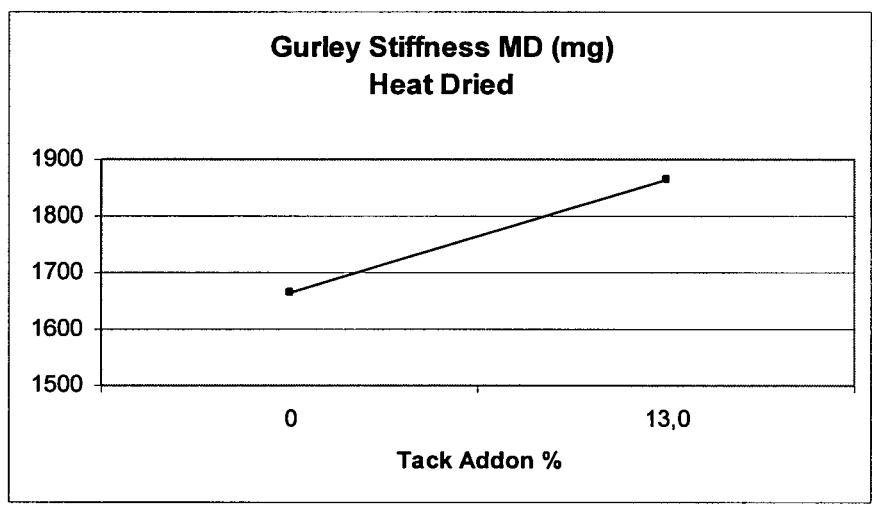

FIG. 6d illustrates the Gurley Stiffness as a function of tack addon % while the filtration material is dried by running through three different heated zones. Examples 233 with no tack addon and 238 (tackifier applied on both sides of the product) show clear increase in stiffness with increasing tack addon %.

Figure 6E:
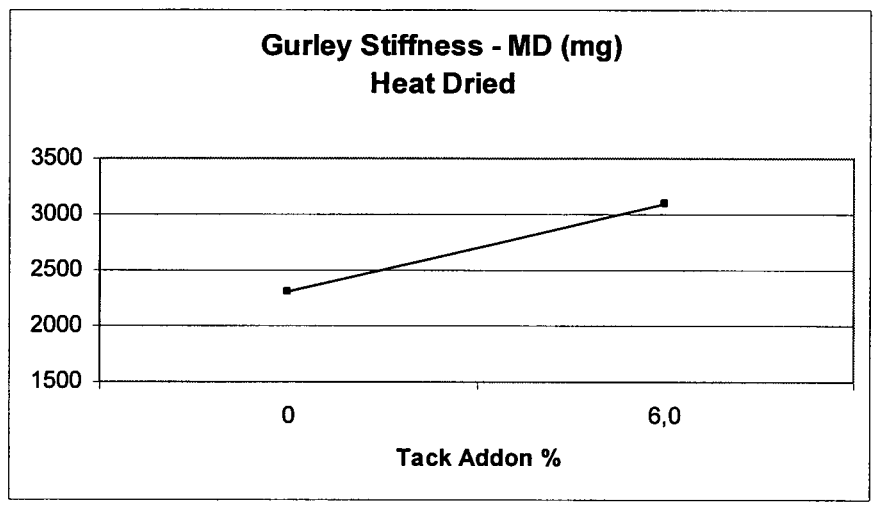

FIG. 6e illustrates the Gurley Stiffness as a function of tack addon % while the filtration material is oven dried by running through three different heated zones. Examples 243 with no tack addon and 244 (tackifier applied on both sides of the product) show clear increase in stiffness with increasing tack addon %.

The above discussed figures show that, in general, the application of a tackifier increases the stiffness of the nonwoven. It is especially so when the drying of the tackifier on the fibers has been performed by heating. Probably the reason, why the examples using ambient air drying give less clear results, can be found from such several variables that affect the drying like the time of drying, the air humidity, the ventilation of the drying space etc. However, the tendency seen in the stiffness of the air dried is similar, i.e. adding a tackifier on a nonwoven filtration material increases stiffness.

Figure 7A:
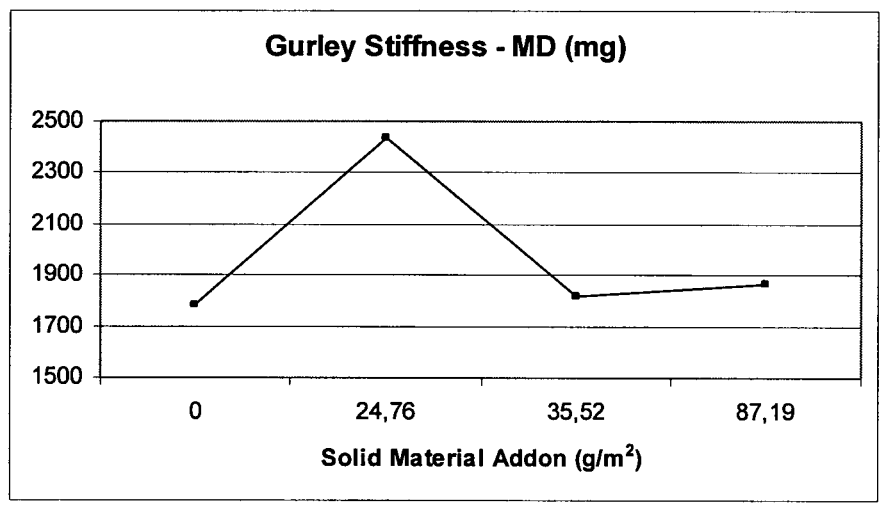
FIGS. 7a and 7b are graphs illustrating the improvement in the Gurley Stiffness as a function of solid material addon in grams added on the tackifier.

FIG. 7a shows how fine solid material applied on the tack surface affects the Gurley stiffness. Here fine particulate material dispersed in the tack solution is evenly spread on a filtration material sample such that three different specimen having 24.76 g/m$^2$, 35.52 g/m$^2$, and 87.19 g/m$^2$ fine particulate material are formed. It is easy to observe that a certain amount of fine material results in clearly increased stiffness values whereas too high amount of fine material decreases the stiffness to the same level as with no fine material at all.

Figure 7B:
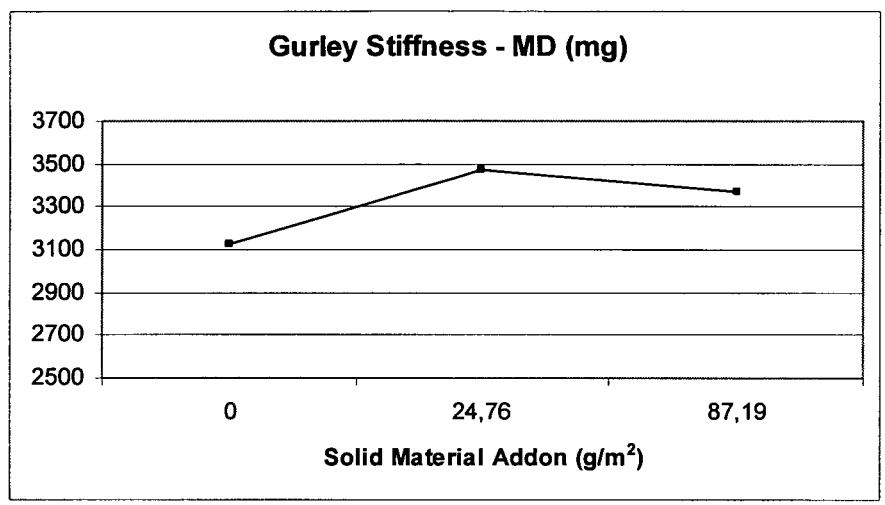

FIG. 7b shows results of another test run, where the same phenomenon may be observed i.e. increasing the fine material introduction from 0 to 24.76 g/m$^2$ increases stiffness some 10 percent, but at least at 87.19 g/m$^2$ increase of fine material the stiffness has decreased.

Thereby it has been proved that when applying fine solid particles on a tackified filtration material the stiffness of the product is improved. However, the performed tests also indicate that there is a certain borderline value for the fine particulate material after which the increase of the material does not any more increase the stiffness but may even reduce it.

Thus, all the above discussed figures show that the stiffness of a filtration material may be improved by applying a tackifier on one or both sides of the product either alone or in combination with applying fine particulate material on the tackified filtration material. Table 1 also shows that the application of a tackifier on a filtration material improves the filtration efficiency (compare, for instance, examples 218-220 giving a PFE of some 52% on average with examples 225-228 talking about PFE of 62% or more). Even if the pressure drop is taken into account i.e. the comparison is done using the Index the same examples show a clear improvement in Index, too. Thus the present invention makes it possible to design the filter more freely than before. Now that the application of the tackifier with or without the particulate material increases both product stiffness and PFE it is possible, on the one hand, to reduce the use of finer fibers while still maintaining the same PFE, or, on the other hand, to reduce the use of higher denier fibers, as the tackifier ensures that the same stiffness may be reached by using finer fibers The above consideration may also be performed in view of the filtration media requirements. I.e. filtration efficiency requires the use of fine fibers, the stiffness requires the use of coarse fibers, and the product price requires the use of coarse fibers. All these prerequisites can be taken into account by adding a tackifier on the filtration media, whereby we are able to manage with coarser fibers and still maintain the same filtration efficiency, whereby the stiffness increases already due to the use of coarser fibers. Then, as the tackifier increases stiffness we could manage with a smaller amount of fibers in total, or the filtration efficiency would be better than before.

The lower part of Table 1b discusses means to reduce the possible problems caused by the tackifier when, for instance, pleating the filtration media. It has already been discussed earlier in this specification that in some process phases it is possible that the working surfaces collect tackifier, or that the tackified filtration media adheres to working surfaces of rollers etc. This tendency of a tackifier may be reduced by using specific chemicals that reduce the tackiness of a tackifier to certain extent. For instance, Table 1b example 253 (no tackifier added), example 254 (tackifier added) and examples 256 and 257 (specific chemical added) show that by specific chemicals it is possible to reduce the coefficient of friction of the tackified surface to the same level as with no tackifier added. Naturally, other examples show intermediate options where the coefficient of friction was reduced but not that much.

Table 2 confirms the fact that the tackifier has very little if anything to do with the pressure drop, as it was specifically studied what kind of an influence the tackifier addition has in the pressure drop dP and the particle filtration efficiency (PFE). The attached table 2 shows that the pressure drop has increased only marginally, in practice not at all, whereas the PFE and Index have increased by more than 20%. Thus it appears that the tackifier addition has only positive effects on the properties of the filtration material.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and scope of the present invention.

TABLE 1a

Examples 218-259
Staple fibers

| Example | 4 den bico | 15 den bico | 15 den polyester | 0.9 den polyester | 2.25 den polyester | 3 den polyester | 45 den polyester | Tribo propylene | Tribo mod acrylic | Layers | Nonwoven filtration media |
|---|---|---|---|---|---|---|---|---|---|---|---|
| 218 | 63 |  | 17 |  |  | 20 |  |  |  |  | 1 |
| 219 | 63 |  | 17 |  |  | 20 |  |  |  |  | 1 |
| 220 | 63 |  | 17 |  |  | 20 |  |  |  |  | 1 |
| 221 | 63 |  | 17 |  |  | 20 |  |  |  | 1 | 1 |
| 222 | 63 |  | 17 |  |  | 20 |  |  |  | 1 | 1 |
| 223 | 63 |  | 17 |  |  | 20 |  |  |  | 1 | 1 |
| 224 | 63 |  | 17 |  |  | 20 |  |  |  | 1 | 1 |
| 225 | 63 |  | 17 |  |  | 20 |  |  |  | 1 | 1 |
| 226 | 63 |  | 17 |  |  | 20 |  |  |  | 1 | 1 |
| 227 | 63 |  | 17 |  |  | 20 |  |  |  | 1 | 1 |
| 228 | 63 |  | 17 |  |  | 20 |  |  |  | 1 | 1 |
| 229 | 63 |  | 17 |  |  | 20 |  |  |  | 1 | 1 |
| 230 | 63 |  | 17 |  |  | 20 |  |  |  | 1 | 1 |
| 231 | 63 |  | 17 |  |  | 20 |  |  |  | 1 | 1 |
| 232 |  | 50 |  |  | 15 | 35 |  |  |  |  | 2 |
| 233 |  | 50 |  |  | 15 | 35 |  |  |  |  | 2 |
| 234 |  | 50 |  |  | 15 | 35 |  |  |  | 1 | 2 |
| 235 |  | 50 |  |  | 15 | 35 |  |  |  | 1 | 2 |
| 236 |  | 50 |  |  | 15 | 35 |  |  |  | 1 | 2 |
| 237 |  | 50 |  |  | 15 | 35 |  |  |  | 1 | 2 |
| 238 |  | 50 |  |  | 15 | 35 |  |  |  | 1 | 2 |
| 239 |  | 37.8 |  |  | 11.4 | 26.5 |  | 12.2 | 12.2 |  | 3 |
| 240 |  | 37.8 |  |  | 11.4 | 26.5 |  | 12.2 | 12.2 | 2 | 3 note 3 |
| 241 |  | 37.8 |  |  | 11.4 | 26.5 |  | 12.2 | 12.2 | 2 | 3 note 3 |
| 242 |  | 37.8 |  |  | 11.4 | 26.5 |  | 12.2 | 12.2 | 2 | 3 note 3 |
| 243 | 50 |  |  |  |  | 25 | 25 |  |  |  | 4 note 2 |
| 244 | 50 |  |  |  |  | 25 | 25 |  |  | 2 | 4 note 2 |
| 245 | 50 |  |  | 8 | 43 |  |  |  |  |  | 5 |
| 246 | 50 |  |  | 8 | 43 |  |  |  |  | 1 | 5 |
| 247 | 50 |  |  | 8 | 43 |  |  |  |  | 1 | 5 |
| 248 | 80 |  |  |  |  | 20 |  |  |  | 1 | 6 |
| 249 | 80 |  |  |  |  | 20 |  |  |  | 1 | 6 |
| 250 | 80 |  |  |  |  | 20 |  |  |  | 1 | 6 |
| 251 | 80 |  |  |  |  | 20 |  |  |  | 1 | 6 |
| 252 | 80 |  |  |  |  | 20 |  |  |  | 1 | 6 |
| 253 | 63 |  | 17 |  |  | 20 |  |  |  | 1 | 1 |
| 254 | 63 |  | 17 |  |  | 20 |  |  |  | 1 | 1 |
| 255 | 63 |  | 17 |  |  | 20 |  |  |  | 1 | 1 |
| 256 | 63 |  | 17 |  |  | 20 |  |  |  | 1 | 1 |
| 257 | 63 |  | 17 |  |  | 20 |  |  |  | 1 | 1 |
| 258 | 63 |  | 17 |  |  | 20 |  |  |  | 1 | 1 |
| 258 | 63 |  | 17 |  |  | 20 |  |  |  | 1 | 1 |
| 259 | 63 |  | 17 |  |  | 20 |  |  |  | 1 | 1 |

TABLE 1b

Examples 218-252

| Example | Tack material | Tack addon (%) | Sides tack applied | Frazier perm. (m³/s/m²) | Gurley - MD (mg) | LED Score | dP (Pa) | 3 to 10 micron PFE | Index |
|---|---|---|---|---|---|---|---|---|---|
| 218 | none | 0 | 0 | 2.73 | 2331 | 57 | 0.62 | 47.7 | 76.9 |
| 219 | none | 0 | 0 | 2.43 | 2203 | 69.3 | 0.72 | 50.5 | 70.1 |
| 220 | none | 0 | 0 | 2.38 | 2945 | 72 | 0.82 | 57.1 | 69.6 |
| 221 | V-60 | 1.4 | 1 | 2.36 | 2535 | 67 | | | |
| 222 | V-60 | 2.5 | 1 | 2.36 | 2730 | 64.3 | | | |
| 223 | V-60 | 11.5 | 1 | 2.59 | 2834 | 55 | 0.63 | 62.2 | 98.7 |
| 224 | V-60 | 3.3 | 2 | 2.36 | 2919 | 66.3 | | | |
| 225 | V-60 | 5.7 | 2 | 2.40 | 2903 | 60 | 0.81 | 69.1 | 85.3 |
| 226 | V-60 | 16.2 | 2 | 2.52 | 3256 | 66.3 | 0.69 | 62.6 | 90.7 |
| 227 | V-60 | 22.6 | 2 | 2.26 | 2893 | 67 | 0.90 | 67.5 | 75.0 |
| 228 | V-60 | 23.8 | 2 | 2.36 | 2612 | 53.3 | 0.82 | 66.6 | 81.2 |
| 229 | Flexcryl 1625 | 11.4 | 2 | 2.29 | 3730 | 94 | 0.81 | 67.3 | 83.1 |
| 230 | Spar Cryl 102 | 7.9 | 2 | 2.19 | 2930 | 80.3 | 0.84 | 66.6 | 79.3 |
| 231 | Spar Cryl 102 | 7.9 | 2 | 2.19 | 2930 | 80.3 | 0.84 | 66.6 | 79.3 |
| 232 | none | 0 | 0 | 3.09 | 2078 | 86.3 | 0.55 | 48.7 | 88.5 |
| 233 | none | 0 | 0 | 3.22 | 1665 | 71 | 0.45 | 37.9 | 84.2 |
| 234 | V-60 | 7.9 | 1 | 2.89 | 2368 | 93 | 0.69 | 59.4 | 86.1 |
| 235 | V-60 | 12.3 | 1 | 2.85 | 2819 | 74.7 | 0.67 | 57.6 | 86.0 |
| 236 | V-60 | 4.6 | 2 | 2.89 | 2205 | 78 | 0.61 | 53.1 | 87.0 |
| 237 | V-60 | 11.7 | 2 | 2.91 | 2220 | 80.7 | 0.65 | 58.8 | 90.5 |
| 238 | V-60 | 13.0 | 2 | 3.24 | 1866 | 83.7 | 0.49 | 51.8 | 105.7 |
| 239 | none | 0 | 0 | 2.57 | 1731 | 65.3 | 0.76 | 77.9 | 102.5 |
| 240 | V-60 | 7.0 | 2 | 2.35 | 1672 | 70 | 0.88 | 68.9 | 78.3 |
| 241 | Flexcryl 1625 | 10.0 | 2 | 2.39 | 2153 | 97 | 0.85 | 75.9 | 89.3 |
| 242 | Spar Cryl 102 | 5.9 | 2 | 2.41 | 1569 | 98.3 | 0.78 | 70.4 | 90.3 |
| 243 | none | 0 | 0 | 2.52 | 2300 | 71.6 | 0.74 | 45.4 | 61.4 |
| 244 | V-60 | 6.0 | 2 | 2.20 | 3099 | 62.1 | 0.96 | 62.1 | 64.7 |
| 245 | none | 0 | 0 | 1.17 | 1965 | 51 | 1.66 | 88.3 | 53.2 |
| 246 | V-60 | 5.0 | 2 | 1.17 | 1965 | 51 | 1.66 | 88.3 | 53.2 |
| 247 | V-60 | 17.5 | 2 | 1.33 | 2720 | 94.3 | 1.57 | 85.4 | 54.4 |
| 248 | V-60 | 1.8 | 1 | 2.45 | 2479 | 63.3 | | | |
| 249 | V-60 | 2.4 | 1 | 2.33 | 3345 | 67 | | | |
| 250 | V-60 | 3.5 | 1 | 2.59 | 1753 | 56.3 | | | |
| 251 | V-60 | 5.1 | 1 | 2.24 | 3123 | 61 | | | |
| 252 | V-60 | 6.4 | 1 | 2.59 | 2035 | 73.7 | | | |

Examples 253-259
Effect of an additive used for both reducing the tackiness and improving the filtration efficiency

| Example | Addon (%) | Wax addon pounds/hr | Tack | Additive | Coefficient of Friction Kinetic avg | Coefficient of Friction Static avg | Rolling ball tack test distance cm | dP (Pa) | 3 to 10 micron PFE |
|---|---|---|---|---|---|---|---|---|---|
| 253 | 0 | 0 | None | None | 0.23 | 0.31 | GT 30 | 0.96 | 46.1 |
| 254 | 7 | 0 | V-60 | None | 0.94 | 1.86 | 24 | 0.98 | 58.2 |
| 255 | 7 | 5 | V-60 | Fluoron brand 200 | 0.53 | 1.59 | 17 | 0.94 | 65.3 |
| 256 | 7 | 5 | V-60 | Lanco brand 1394L4 | 0.29 | 0.32 | GT30 | 0.83 | 48.2 |
| 257 | 7 | 5 | V-60 | Lanco brand TF1768 | 0.28 | 0.31 | GT 30 | 0.83 | 50.9 |
| 258 | 7 | 5 | V-60 | Lanco brand Glidd 3933 | 0.73 | 1.78 | 21 | 0.82 | 57.8 |
| 258 | 7 | 5 | V-60 | Pinnacle brand 2510 | 0.47 | 1.3 | GT 30 | 0.80 | 66.7 |
| 259 | 8 | 0 | V-60 | 80/20 blend V-60/Hycar 26459 | 1.11 | 1.53 | GT 30 | 0.77 | 61.6 | note 1 -
tack material Tg: HyStretch V-60, −60° C.; FLEXCRYL 1625, −48° C.; Spar Cryl 102, −35° C.
note 2 -
nonwoven material 4 is a 2 layer material
note 3 -
contains a layer containing cotton or polyester/cotton fibers comprising about 15% to about 35% polyester/cotton blend or cellulosic fibers

TABLE 2

Effect of the Tackifier on Pressure Drop and Particle Filtration Efficiency

| Samples | Tack Addon % | dP (Pa) | PFE, % | Index |
|---|---|---|---|---|
| Uncoated V-PM6.1 | 0 | 0.96 | 46.1 | 48.0 |
| HyStretch V-60 | 7 | 0.98 | 58.2 | 59.4 |

What is claimed:

1. A tackified air filtration media having improved stiffness and foldability comprising a thermally bonded nonwoven web comprising a generally homogeneous mixture of at least two types of fibers, the web comprising
about 10% to about 90% by weight of a first type of fibers having a length of about 6 mm to about 200 mm, the fibers including a first fiber portion extending substantially continuously along the length of each fiber and comprising a first thermoplastic polymeric material having a first melting point and a second fiber portion extending substantially continuously along the length of each fiber and defining at least a portion of a fiber exterior surface, the second fiber portion comprising a second thermoplastic polymeric material having a second melting point lower than the first melting point, about 5% to about 70% by weight of a second type of fibers having a length of about 6 mm to about 200 mm, and a denier of 5 or less, about 0% to about 40% by weight of a third type of fibers having a length of about 6 mm to about 200 mm and a denier of 8 or more; the nonwoven web having a basis weight in the range of about 90 gsm to about 370 gsm, preferably between 120-275 gsm, and a thickness of about 1.0 mm to about 6.4 mm; and from about 0.5 percent to about 30 percent by weight of the nonwoven web of a tackifier on fibers of the air filtration media, the nonwoven web being configured for use as self-supporting air filtration media and having a Gurley stiffness of at least 2930 mg when measured in the machine direction.

2. The tackified air filtration media of claim 1, characterized in that the first fiber type is selected from at least one of about 30% to about 90% at most 4 denier conjugate fibers comprising polyester first and second fiber portions, and about 30% to about 90% at least 10 denier conjugate fibers comprising polyester first and second fiber portions.

3. The tackified air filtration media of claim 1, characterized in that the second type of fibers comprises about 10% to about 40% by weight of monocomponent polyester fibers having a denier in the range of about 0.9 to 5.

4. The tackified air filtration media of claim 1, characterized in that the second type of fibers comprises additionally about 3% to about 30% by weight of other monocomponent polyester fibers having a denier in the range of about 0.9 to 5.

5. The tackified air filtration media of claim 1, characterized in that the second type of fibers comprises about 10% to about 30% by weight of monocomponent polyester fibers having a denier of 4.

6. The tackified air filtration media of claim 1, characterized in that the third type of fibers comprises about 5% to about 30% by weight of monocomponent polyester fibers having a denier in the range of 8 to about 45.

7. The tackified air filtration media of claim 1, characterized in that the second type of fibers comprises about 10% to about 50% by weight of about 2-4 denier chargeable polypropylene fibers, and about 10% to about 50% about 2-4 denier chargeable modacrylic fibers.

8. The tackified air filtration media of claim 1, characterized in that the second or third type of fibers comprises about 15% to about 30% polyester/cotton blend fibers; or about 15% to about 35% cellulosic fibers.

9. The tackified air filtration media of claim 8, characterized in that one of the second type and third type of fibers is superimposed as a separate nonwoven web on the thermally bonded nonwoven web comprising a generally homogeneous mixture of the first type of fibers and the other of the second type and third type of fibers.

10. A system including the tackified air filtration media of claim 1, characterized in that a nonwoven web is superimposed on the filtration media.

11. The system of claim 10, characterized in that said nonwoven web is a carded and cross lapped matt.

12. The system of claim 10, characterized in that the nonwoven web comprises continuous filaments or discontinuous fiber.

13. The tackified air filtration media of claim 8, characterized in that the cellulosic fibers are kenaf fibers.

14. The tackified air filtration media of claim 1, characterized in that about 1.5% to about 15% tackifier by weight of the air filtration media is applied on fibers of the air filtration media.

15. The tackified air filtration media of claim 1, characterized in that the third type of fibers has a denier greater than 10.

16. The tackified air filtration media of claim 1, characterized in that about 1.5% to about 6% tackifier by weight of the air filtration media is applied on the air filtration media.

17. The tackified air filtration media of claim 1, characterized in that the tackifier is applied on one or both surfaces of the filtration media.

18. The tackified air filtration media of claim 1, characterized in that fine particulate material is applied into communication with the tackifier.

19. The tackified air filtration media of claim 1, characterized in that 5 to 150 g/m2 fine particulate material is applied into communication with the tackifier.

20. The tackified air filtration media of claim 1, characterized in that fine particulate material is applied into communication with one or both tackified surfaces of the filtration media.

21. A method of making a tackified air filtration media having improved stiffness and foldability comprising:
forming a fiber mixture, comprising
about 10% to about 90% by weight of a first type of fibers having a length of about 0.6 cm to about 20 cm, the fibers including a first fiber portion extending substantially continuously along the length of each fiber and comprising a first thermoplastic polymeric material having a first melting point and a second fiber portion extending substantially continuously along the length of each fiber and defining at least a portion of a fiber exterior surface, the second fiber portion comprising a second thermoplastic polymeric material having a second melting point lower than the first melting point,
about 5% to about 70% by weight of a second type of fibers having a length of about 0.6 cm to about 20 cm, and a denier of 5 or less, and
about 0% to about 40% by weight of a third type of fibers having a length of about 0.6 to about 20 cm and a denier of 8 or more;
forming the fiber mixture into a nonwoven matt;
bonding the fibers in the nonwoven matt to have a basis weight in the range of about 90 gsm to about 370 gsm, and a thickness of about 1.0 mm to about 6.4 mm, and
applying 0.5 to about 30 percent by weight of the nonwoven matt of a tackifier to fibers of the bonded nonwoven matt to form the tackified air filtration media, the tackified air filtration media being configured for use as self-supporting air filtration media and having a Gurley stiffness of at least 2930 ma when measured in the machine direction.

22. A method of making a self-supporting filter having improved stiffness and foldability comprising:
forming a fiber mixture, comprising
about 10% to about 90% by weight of a first type of fibers having a length of about 0.6 cm to about 20 cm, the fibers including a first fiber portion extending substantially continuously along the length of each fiber and comprising a first thermoplastic polymeric material having a first melting point and a second fiber portion extending substantially continuously along the length of each fiber and defining at least a portion of a fiber exterior surface, the second fiber portion comprising a second thermoplastic polymeric material having a second melting point lower than the first melting point, about 5% to about 70% by weight of a second type of fibers having a length of about 0.6 cm to about 20 cm, and a denier of 5 or less, and about 0% to about 40% by weight of a third type of fibers having a length of about 0.6 to about 20 cm and a denier of 8 or more;

forming the fiber mixture into a nonwoven matt;

bonding the fibers in the nonwoven matt to have a basis weight in the range of about 90 gsm to about 370 gsm, and a thickness of about 1.0 mm to about 6.4 mm, applying 0.5 to about 30 percent by weight of the nonwoven matt of a tackifier to fibers of the bonded nonwoven matt to form the tackified air filtration media, drying the tackifier, and pleating the nonwoven matt to form a three-dimensional self-supporting filter.

23. The method of claim 21, characterized in that the step of matt forming comprises air laying, wet-laying or carding the fiber mixture to form the nonwoven matt.

24. The method of claim 21, characterized in that the step of matt forming comprises carding the fiber mixture to form a web and cross lapping the web to form the nonwoven matt.

25. The method of claim 21, characterized in that the step of bonding comprises thermal bonding of the fibers in the nonwoven matt.

26. The method of claim 21, characterized in that the step of bonding comprises entangling the fibers.

27. The method of claim 21, characterized in the additional steps, before the step of applying the tackifier, of blending at least one of about 10% to about 50% by weight of the nonwoven matt of about 2-4 denier chargeable polypropylene fibers and about 10% to about 50 by weight of the nonwoven matt of about 2-4 denier chargeable modacrylic fibers, applying said blend over the matt, and entangling the chargeable fibers into the matt.

28. The method of claim 27, further comprising the step of heating the matt and the chargeable fibers to partially melt and fuse the fibers.

29. The method of claim 21, characterized in superimposing a nonwoven web on said matt, and entangling the matt and the nonwoven to form a composite filtration media.

30. The method of claim 29, characterized in entangling the nonwoven web on said matt by adhesive bonding, thermal bonding, mechanical entanglement or ultrasonic bonding.

31. The method of claim 29, characterized in that the tackified air filtration media has a Gurley stiffness of at least 2220 mg when measured in the machine direction.

32. The method of claim 29, characterized in that the nonwoven web is manufactured by means of spunbonding, carding or wet-laying.

33. The method of claim 21, characterized in that the step of applying the tackifier comprises foaming, spraying, brushing or dipping the tackifier on a surface of the bonded nonwoven matt/filtration media.

34. The method of claim 21, characterized in that the tackifier is applied as an emulsion, solution or foam.

35. The method of claim 22, characterized in the step of pleating the media to form a self-supporting three-dimensional structure.

36. The method of claim 21, characterized in applying the tackifier on one or both surfaces of the filtration media.

37. The method of claim 21, characterized in the step of applying fine particulate material into communication with the tackifier.

38. The method of claim 21, characterized in the step of applying fine particulate material on the filtration media together with the tackifier.

39. A self-supporting pleated filter having improved stiffness and foldability comprising a thermally bonded nonwoven web comprising a generally homogeneous mixture of at least two types of fibers, the web comprising about 10% to about 90% by weight of a first type of fibers having a length of about 0.6 cm to about 20 cm, the fibers including a first fiber portion extending substantially continuously along the length of each fiber and comprising a first thermoplastic polymeric material having a first melting point and a second fiber portion extending substantially continuously along the length of each fiber and defining at least a portion of a fiber exterior surface, the second fiber portion comprising a second thermoplastic polymeric material having a second melting point lower than the first melting point, about 5% to about 70% by weight of a second type of fibers having a length of about 0.6 cm to about 20 cm, and a denier of 6 or less, and about 0% to about 40% by weight of a third type of fibers having a length of about 0.6 to about 20 cm and a denier of 8 or more; the nonwoven web having a basis weight in the range of about 90 gsm to about 370 gsm, and a thickness of about 1.0 mm to about 6.4 mm; and from about 0.5 percent to about 30 percent by weight of the nonwoven web of a tackifier on fibers of the nonwoven web, wherein the filter has sufficient stiffness to be self-supporting when used as a pleated air filter.

40. The self-supporting filter of claim 39, characterized in that the first fiber type is selected from at least one of about 30% to about 90% at most 4 denier conjugate fibers comprising polyester first and second fiber portions of about 30% to about 90% at least 10 denier conjugate fibers comprising polyester first and second fiber portions.

41. The self-supporting filter of claim 39, characterized in that the second type of fibers comprises about 10% to about 40% by weight of monocomponent polyester fibers having a denier in the range of about 0.9 to 5.

42. The self-supporting filter of claim 39, characterized in that the second type of fibers comprises additionally about 3% to about 30% by weight of other monocomponent polyester fibers having a denier in the range of about 0.9 to 5.

43. The self-supporting filter of claim 39, characterized in that the second type of fibers comprises about 10% to about 30% by weight of monocomponent polyester fibers having a denier of 4.

44. The self-supporting filter of claim 39, characterized in that the third type of fibers comprises about 5% to about 30% by weight of monocomponent polyester fibers having a denier in the range of 8 to about 45.

45. The self-supporting filter of claim 39, characterized in that the second type of fibers comprises about 10% to about 50% by weight of about 2-4 denier chargeable polypropylene fibers, and about 10% to about 50% about 2-4 denier chargeable modacrylic fibers.

46. The self-supporting filter of claim 39, characterized in that the second or third type of fibers comprises about 15% to about 30% polyester/cotton blend fibers; or about 15% to about 35% cellulosic fibers.

47. The self-supporting filter of claim 46, characterized in that one of the second type and third type of fibers is superimposed as a supplemental nonwoven web on the thermally bonded nonwoven web comprising the first type of fibers and the other of the second type and third type of fibers.

48. The self-supporting filter of claim 39, characterized in that a supplemental nonwoven web comprising the third type of fibers is superimposed on the nonwoven web comprising the first type of fibers and the second type of fibers.

49. The self-supporting filter of claim 48, characterized in that said nonwoven web is a carded and cross lapped matt.

50. The self-supporting filter of claim 46, characterized in that the cellulosic fibers are kenaf fibers.

51. The self-supporting filter of claim 39, characterized in that about 1.5% to about 15% tackifier by weight of the air filtration media is applied on fibers of the air filtration media.

52. The self-supporting filter of claim 39, characterized in that the third type of fibers has a denier greater than 10.

53. The self-supporting filter of claim 39, characterized in that about 1.5% to about 6% tackifier by weight of the air filtration media is applied on the air filtration media.

54. The self-supporting filter of claim 39, characterized in that the tackifier is applied on one or both surfaces of the thermally bonded nonwoven web.

55. The self-supporting filter of claim 39, characterized in that fine particulate material is applied into communication with the tackifier.

56. The self-supporting filter of claim 39, characterized in that 5 to 150 g/m2 fine particulate material is applied into communication with the tackifier.

57. The self-supporting filter of claim 39, characterized in that the filter has opposite first and second tackified surfaces, and fine particulate material is applied into communication with at least one of the first and second tackified surfaces.

58. The tackified air filtration media of claim 1, wherein the first, second and third types of fibers consist essentially of synthetic polymeric fibers.

59. The self-supporting filter of claim 39, wherein the first, second and third types of fibers consist essentially of synthetic polymeric fibers.

\* \* \* \* \*

UNITED STATES PATENT AND TRADEMARK OFFICE
CERTIFICATE OF CORRECTION

| | | |
|---|---|---|
| PATENT NO. | : 8,668,758 B2 | Page 1 of 1 |
| APPLICATION NO. | : 12/734541 | |
| DATED | : March 11, 2014 | |
| INVENTOR(S) | : Duello et al. | |

It is certified that error appears in the above-identified patent and that said Letters Patent is hereby corrected as shown below:

On the Title Page, Item [54], Please delete "TRACKIFIED" and insert --TACKIFIED--.

Signed and Sealed this
Seventeenth Day of June, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,668,758 B2  
APPLICATION NO. : 12/734541  
DATED : March 11, 2014  
INVENTOR(S) : Duello et al.

Page 1 of 1

It is certified that error appears in the above-identified patent and that said Letters Patent is hereby corrected as shown below:

On the Title Page, Item [54], and in the Specification, Column 1, Line 1, Please delete "TRACKIFIED" and insert --TACKIFIED--.

This certificate supersedes the Certificate of Correction issued June 17, 2014.

Signed and Sealed this  
Fifteenth Day of July, 2014

Michelle K. Lee  
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,668,758 B2 | Page 1 of 1 |
| APPLICATION NO. | : 12/734541 | |
| DATED | : March 11, 2014 | |
| INVENTOR(S) | : Duello et al. | |

It is certified that error appears in the above-identified patent and that said Letters Patent is hereby corrected as shown below:

In the Claims

Claim 21, column 26, line 52, delete "ma" and insert --mg--.

Signed and Sealed this
Seventh Day of October, 2014

Michelle K. Lee
*Deputy Director of the United States Patent and Trademark Office*